US012050389B2

(12) United States Patent
Strand et al.

(10) Patent No.: US 12,050,389 B2
(45) Date of Patent: Jul. 30, 2024

(54) ELECTROLYTE ADDITIVE FOR CONTROLLING MORPHOLOGY AND OPTICS OF REVERSIBLE METAL FILMS

(71) Applicants: THE REGENTS OF THE UNIVERSITY OF COLORADO, A BODY CORPORATE, Denver, CO (US); THE BOARD OF TRUSTEES OF THE LELAND STANFORD JUNIOR UNIVERSITY, Stanford, CA (US)

(72) Inventors: Michael T. Strand, Boulder, CO (US); Christopher Barile, Reno, NV (US); Tyler S. Hernandez, Boulder, CO (US); Andrew L Yeang, Boulder, CO (US); Michael D. McGehee, Boulder, CO (US)

(73) Assignees: The Regents of the University of Colorado, A Body Corporate, Denver, CO (US); The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/506,170

(22) Filed: Oct. 20, 2021

(65) Prior Publication Data

US 2022/0128878 A1 Apr. 28, 2022

Related U.S. Application Data

(60) Provisional application No. 63/104,975, filed on Oct. 23, 2020.

(51) Int. Cl.

*G02F 1/15* (2019.01)
*B32B 17/10* (2006.01)

(Continued)

(52) U.S. Cl.

CPC ...... *G02F 1/1506* (2013.01); *B32B 17/10036* (2013.01); *B32B 17/10513* (2013.01);

(Continued)

(58) Field of Classification Search

CPC .... G02F 1/1506; G02F 1/13439; G02F 1/155; G02F 2001/164; B32B 17/10036;

(Continued)

(56) References Cited

U.S. PATENT DOCUMENTS

| | | | |
|---|---|---|---|
| 6,111,685 A * | 8/2000 | Tench | G02F 1/1506 359/267 |
| 6,256,135 B1 * | 7/2001 | Tench | G02F 1/1506 359/266 |

(Continued)

FOREIGN PATENT DOCUMENTS

| | | |
|---|---|---|
| WO | 2019/018667 A1 | 1/2019 |
| WO | 2019/099919 A1 | 5/2019 |

(Continued)

OTHER PUBLICATIONS

Alcaraz, Geoffrey Kirk A., et al. "Thermally-stable dynamic windows based on reversible metal electrodeposition from aqueous electrolytes." Journal of Materials Chemistry C 6.8 (2018): 2132-2138.

(Continued)

*Primary Examiner* — Thoi V Duong
(74) *Attorney, Agent, or Firm* — Workman Nydegger

(57) ABSTRACT

Dynamic windows with adjustable tint give users greater control over flow of light and heat. Reversible metal electrodeposition dynamic windows include (i) a transparent or translucent conductive electrode; (ii) an electrolyte solution in contact with the electrode, the electrolyte solution comprising metal cations that are reversibly electrodeposited onto the transparent electrode upon application of a cathodic (Continued)

potential; and (iii) a counter electrode. The electrolyte solution advantageously includes a small amount of an additive (e.g., an inhibitor, an accelerator, a leveler, or an organic or inorganic molecule that similarly serves to enhance the surface morphology of the metal cations during reversible metal electrodeposition onto the transparent electrode). Such enhancement of surface morphology during the reversible electrodeposition of the metal tinting layer over the electrode enhances one or more of color neutrality, transmittance characteristics of visible wavelengths (e.g., ability to achieve a near 0% transmission privacy state), infrared reflectance, or switching speed.

25 Claims, 28 Drawing Sheets

(51) Int. Cl.

| | |
|---|---|
| ***C09K 9/00*** | (2006.01) |
| ***E06B 9/24*** | (2006.01) |
| ***G02F 1/1343*** | (2006.01) |
| ***G02F 1/1506*** | (2019.01) |
| ***G02F 1/155*** | (2006.01) |
| *E06B 3/67* | (2006.01) |

(52) U.S. Cl.
CPC .................. *C09K 9/00* (2013.01); *E06B 9/24* (2013.01); *G02F 1/13439* (2013.01); *G02F 1/155* (2013.01); *E06B 3/6722* (2013.01); *E06B 2009/2464* (2013.01); *G02F 2001/164* (2019.01)

(58) Field of Classification Search
CPC ..... B32B 17/10513; B32B 17/06; C09K 9/00; E06B 9/24; E06B 3/6722; E06B 2009/2464
See application file for complete search history.

(56) References Cited

U.S. PATENT DOCUMENTS

| | | | |
|---|---|---|---|
| 6,301,039 | B1 | 10/2001 | Tench |
| 6,552,843 | B1 | 4/2003 | Tench et al. |
| 7,317,106 | B2 | 1/2008 | Warner et al. |
| 9,383,619 | B2 | 7/2016 | Kim et al. |
| 2005/0248825 | A1 | 11/2005 | Warren et al. |
| 2010/0252446 | A1 | 10/2010 | Kuzmanovic et al. |
| 2012/0016504 | A1 | 1/2012 | Gough et al. |
| 2014/0257073 | A1 | 9/2014 | Machon et al. |
| 2016/0317085 | A1 | 11/2016 | Razavi et al. |
| 2016/0360970 | A1 | 12/2016 | Tzvieli et al. |
| 2018/0193644 | A1 | 7/2018 | Annoni et al. |
| 2020/0142273 | A1 | 5/2020 | Barile et al. |
| 2020/0363690 | A1 | 11/2020 | Barile et al. |
| 2022/0338801 | A1 | 10/2022 | Vu et al. |
| 2023/0323553 | A1 | 10/2023 | Yeang et al. |
| 2023/0393441 | A1 | 12/2023 | Yeang et al. |
| 2024/0111200 | A1 | 4/2024 | Hernandez et al. |

FOREIGN PATENT DOCUMENTS

| | | | |
|---|---|---|---|
| WO | 2021/086834 | A1 | 5/2021 |
| WO | 2021/155247 | A1 | 8/2021 |

OTHER PUBLICATIONS

Haataja, Mikko, David J. Srolovitz, and Andrew B. Bocarsly. "Morphological stability during electrodeposition: II. Additive effects." Journal of the Electrochemical Society 150.10 (2003): C708.
Hernandez et al., "Electrolyte for Improved Durability of Dynamic Windows Based on Reversible Metal Electrodeposition", Joule, vol. 4,Jul. 15, 2020, pp. 1501-1513.
Islam, Shakirul M., and Christopher J. Barile. "Dynamic Windows Using Reversible Zinc Electrodeposition in Neutral Electrolytes with High Opacity and Excellent Resting Stability." Advanced Energy Materials 11.22 (2021): 2100417.
Islam, Shakirul M., Christine N. Fini, and Christopher J. Barile. "Dynamic Windows Based on Reversible Metal Electrodeposition with Enhanced Functionality." Journal of The Electrochemical Society 166.8 (2019): D333.
Strand, Michael T., et al. "Polymer inhibitors enable> 900 cm 2 dynamic windows based on reversible metal electrodeposition with high solar modulation." Nature Energy 6.5 (2021): 546-554.
Yeang et al., "Metal Mesh Design for Dynamic Windows Based on Reversible Metal Electrodeposition", ECS Meeting Abstracts, Jun. 2, 2022, pp. 1-4.
Barile et al., "Dynamic Windows with Neutral Color, High Contrast, and Excellent Durability Using Reversible Metal Electrodeposition," Joule, vol. 1, Sep. 6, 2017, pp. 133-145.
Defoor, CL et al. "Controlling the optical properties of dynamic windows based on reversible metal electrodeposition". ACS Appl. Electron. Mater. Dec. 31, 2019.
Hernandez. TS, et al. "Bistable black electrochromic windows based on the reversible metal electrodeposition of Bi and Cu". ACS Energy letters. Dec. 6, 2017.
International Search Report and Written Opinion received for PCT Patent Application No. PCT/US23/018313, dated Jul. 13, 2023, 9 pages.
International Search Report and Written Opinion received for PCT Patent Application No. PCT/US21/15851, dated Jun. 28, 2021, 8 pages.
International Search Report and Written Opinion received for PCT Patent Application No. PCT/US21/56100, dated Feb. 17, 2022, 11 pages.
Strand, "Dynamic Glass Based on Reversible Metal Electrodeposition," Dissertation Submitted to the Department of Materials Science and Engineering and the Committee on Graduate Studies of Stanford University, Nov. 2020.
International Preliminary Report on Patentability received for PCT Patent Application No. PCT/US2020/050532, mailed on Mar. 24, 2022, 9 pages.
International Search Report and Written Opinion received for PCT Patent Application No. PCT/US2020/050532, mailed on Dec. 16, 2020, 11 pages.
International Search Report and Written Opinion received for PCT Patent Application No. PCT/US23/67746, mailed on Nov. 6, 2023, 9 pages.
McGehee, "Robust Large-Scale Dynamic Windows using Reversible Metal Electrodeposition" OSTI.GOV, Sep. 6, 2021, p. 25.
Supplementary European Search Report received for EP Patent Application No. 21747478.2, mailed on Jan. 31, 2024, 8 pages.
Truong et al., "Painometry: Wearable and Objective Quantification System for Acute Postoperative Pain", MobiSys '20: Proceedings of the 18th International Conference on Mobile Systems, Applications, and Services. Jun. 2020 [online] < http://mnslab.org/tamvu/paper/2020%20Painometry_Hoang. pdf> <DOI:10.1145/3386901.3389022>.
Yeang, et al., Transparent Metal Mesh Electrode Design for Reversible, May 31, 2023, U.S. Appl. No. 63/347,983.

* cited by examiner

⊕ = $M^+$ ⊖ = $e^-$ = OH

FIG. 1E
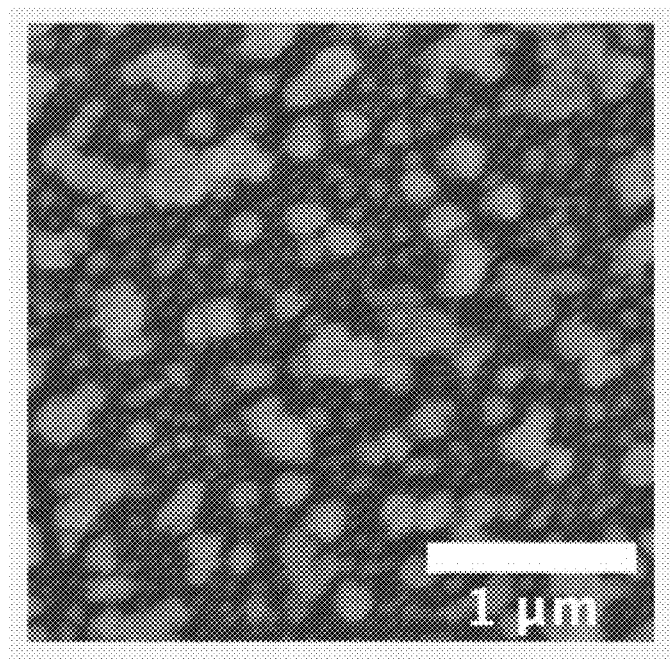
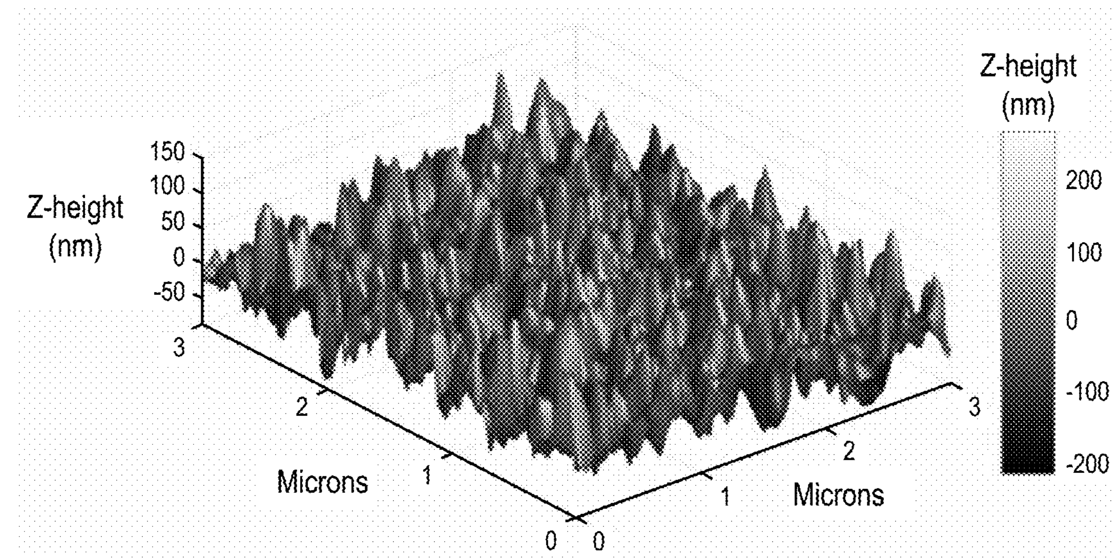
FIG. 1F

FIG. 1G
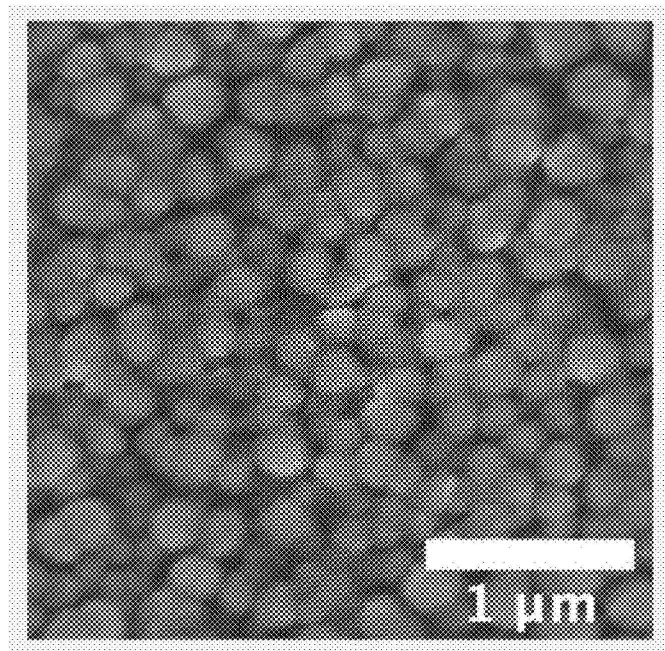
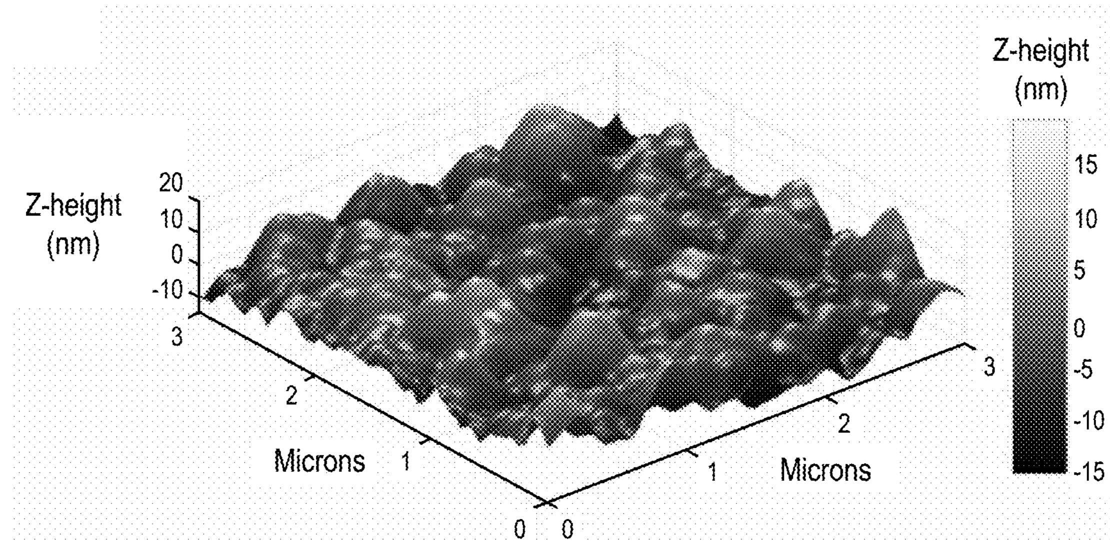
FIG. 1H

FIG. 29A
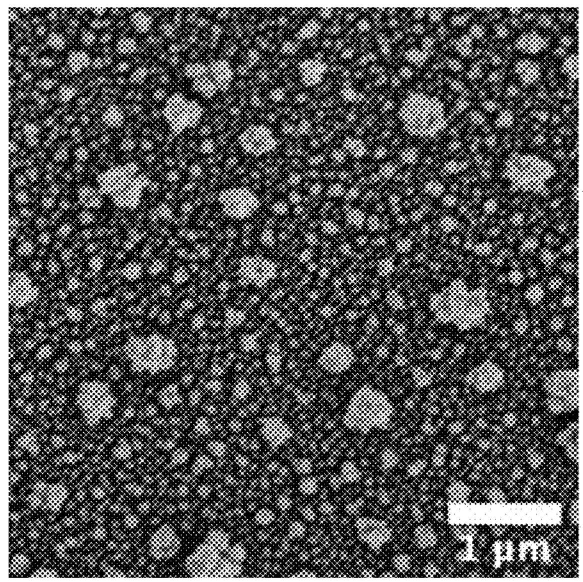
FIG. 29B
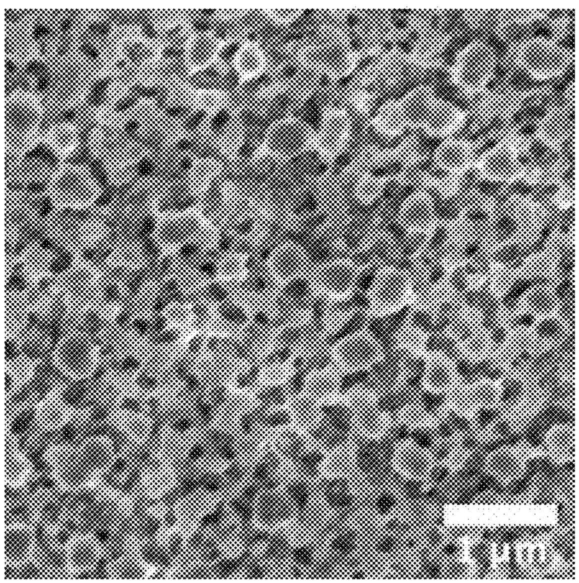
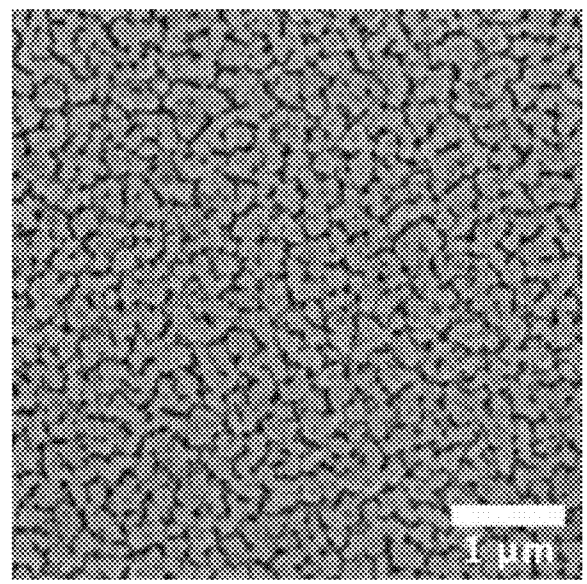
FIG. 29C

ELECTROLYTE ADDITIVE FOR CONTROLLING MORPHOLOGY AND OPTICS OF REVERSIBLE METAL FILMS

CROSS REFERENCE TO RELATED APPLICATIONS

The present application claims priority to and the benefit of U.S. Provisional Patent Application No. 63/104,975 filed Oct. 23, 2020, entitled "ELECTROLYTE ADDITIVE FOR CONTROLLING MORPHOLOGY AND OPTICS OF REVERSIBLE METAL FILMS," which application is herein incorporated by reference in its entirety.

STATEMENT REGARDING FEDERALLY SPONSORED RESEARCH OR DEVELOPMENT

This invention was made with government support under grant number DE-EE0008226 awarded by the U.S. Department of Energy. The government has certain rights in the invention.

BACKGROUND

Dynamic windows control both the light and heat flow in and out of buildings while maintaining the view through the glass, thus offering both energetic and aesthetic advantages over static controls such as blinds or shades. A recent study by View, Inc. and Cornell University showed that implementing dynamic windows in office buildings can improve employee productivity by up to 2% through reduced glare and optimal temperature and lighting control. In addition to the aesthetic advantages, dynamic windows can lead to an average of ~10-20% energy savings over static low-E windows by decreasing energy consumption associated with heating, ventilation, and air conditioning (HVAC).

Over the past several decades, the majority of dynamic window research has focused on electrochromic conductive organic molecules and ion-intercalation based metal oxide electrochromic materials (particularly $WO_3$ and $NiO_x$) that change color upon application of a voltage. Despite the numerous promising advantages of such windows over static lighting controls, they have yet to achieve widespread commercialization due to their inability to simultaneously provide long-term reliability and durability, color-neutral operational characteristics, fast switching on a large-scale, and reasonable cost.

An exciting alternative to electrochromism is reversible metal electrodeposition (RME). These windows operate through the reversible electrochemical deposition of metal on and off a transparent conducting oxide (TCO) electrode, such as indium tin oxide (ITO), fluorine doped tin oxide (FTO), carbon nanotube, etc. Such windows include an electrolyte between the electrodes, with solubilized, nearly colorless metal cations that can be reduced upon application of a cathodic potential to the TCO to induce optical tinting. While "transparent" is typically used herein for simplicity in describing the electrode, it will be appreciated that the scope includes translucent materials as well.

Reversing the polarity oxidizes the metallic film, effectively stripping it back into the electrolyte, thus allowing the window to return to its initial transparent state. Pt nanoparticles adhered to the ITO surface serve as an enhanced metal nucleation seed layer to allow for uniform metal electrodeposition on a large scale without significantly affecting the transmissivity or conductivity of the electrode. Such windows promise the potential to switch between transparent and color-neutral opaque states in under a minute over thousands of cycles.

For any electrochromic "smart" window technology to show viability in the market, it must be durable enough to last at least 20-30 years without signs of degradation. While some academic research groups have employed RME for optical switching devices, these have typically been for reversible mirrors, small-scale pixel displays, or electronic paper applications. In addition to durability and cost effectiveness, any viable RME window must also be scalable to a sufficiently large size (e.g., 1 $m^2$ or more) for use in window applications, should achieve neutral color transmission characteristics across the applicable tinting spectrum, should provide fast switching speed, and the ability to provide zero or near zero transmission, so as to provide a full blackout privacy state when fully tinted.

SUMMARY

The present disclosure relates to reversible metal electrodeposition (RME) for use in dynamic windows and similar devices, examples of which include, but are not limited to windows, greenhouses, electric and other vehicles, transition sunglasses, goggles, tunable optics, clear-to-black monitors or other displays, adjustable shutters, IR modulators, thermal camouflage, and the like. An exemplary metal-based dynamic window device may include a transparent or translucent conductive electrode. The device further includes an electrolyte in contact with the transparent or translucent conductive electrode, the electrolyte comprising metal cations in solution that can be reversibly electrodeposited onto the transparent or translucent conductive electrode. A counter electrode (e.g., also transparent or translucent) is also included, where the electrolyte is sandwiched between the electrodes. The electrolyte further comprises an additive configured to enhance the surface morphology of deposited metal cations during reversible metal electrodeposition, so as to enhance one or more of color neutrality, transmittance of visible wavelengths, infrared reflectance, or switching speed of the dynamic window.

In an embodiment, the electrolyte additive may be a polymer, examples of which include a polyol, an amine-based polymer, or a cellulose derivative. More specific examples of such additives include polyvinyl alcohol, polyvinyl pyrrolidone, or hydroxyethyl cellulose.

In an embodiment, the electrolyte additive can be one or more of an inhibitor as used in electroplating, an accelerator as used in electroplating, a leveler as used in electroplating, or an organic or inorganic molecule that similarly serves to enhance the surface morphology of a deposited film formed from the metal cations during reversible metal electrodeposition onto the transparent electrode.

In an embodiment, the electrolyte additive is present in the electrolyte in an amount of up to 10% by weight, at least 0.001% by weight, or from 0.01% to 1% by weight.

In an embodiment, the additive reduces an RMS surface roughness of a reversibly deposited metal layer onto the transparent electrode to a value that is less than 30 nm, less than 25 nm, less than 20 nm, less than 15 nm, less than 10 nm, or less than 5 nm.

In an embodiment, the dynamic window is configured to achieve a near zero transmissivity to provide a privacy state, where transmission of visible light wavelengths after full tinting is 1% or less, 0.1% or less, 0.01% or less, or 0.001% or less.

In an embodiment, the dynamic window is configured to achieve a high infrared reflectance of wavelengths in the range of 700 nm to 1200 nm that is at least 30%, at least 40%, at least 50%, at least 60%, or at least 70%.

In an embodiment, the dynamic window is configured to achieve color neutral characteristics with a chroma (C*) of less than 10, less than 8, or less than 5, over an operative VLT range of the dynamic window.

In an embodiment, the dynamic window is configured to achieve color neutral characteristics with |a*| and/or |b*| values of less than 5, over an operative VLT range of the dynamic window.

In an embodiment, the metal cations in the electrolyte comprise copper (e.g., copper and bismuth).

In an embodiment, the electrolyte is an aqueous electrolyte solution.

In an embodiment, the electrolyte may be free of metal oxides, such as used in conventional metal oxide electrochromic dynamic windows.

In an embodiment, the electrolyte further comprises an anion selected for its ability to (i) maintain solubility of components in the electrolyte solution and/or (ii) minimize or prevent etching of the transparent or translucent conductive electrode. An example of such an anion is perchlorate. In an embodiment, the electrolyte solution may be free of chloride ions.

In an embodiment, the device may be operable with fast switching speeds as described herein, with relatively low applied voltages (e.g., no more than 2V, or no more than 1V, such as 0.5 to 1V, or 0.6 to 0.8 V).

Another embodiment is directed to an electrochromic dynamic window article capable of reversible metal electrodeposition, comprising a transparent or translucent conductive electrode, an electrolyte solution in contact with the transparent or translucent conductive electrode, the electrolyte solution comprising metal cations that can be reversibly electrodeposited onto the transparent or translucent conductive electrode upon application of a cathodic potential, and a counter electrode, wherein the electrolyte solution further comprises an additive that is an inhibitor, an accelerator, a leveler, or an organic or inorganic molecule that similarly serves to enhance the surface morphology of the metal cations during reversible metal electrodeposition onto the transparent electrode.

Features from any of the disclosed embodiments may be used in combination with one another, without limitation. For example, any of the compositional or other limitations described with respect to one embodiment may be present in any of the other described embodiments. In addition, other features and advantages of the present disclosure will become apparent to those of ordinary skill in the art through consideration of the following detailed description and the accompanying drawings.

BRIEF DESCRIPTION OF THE DRAWINGS

FIG. 1E: scanning electron microscopy (SEM) image of metal electrodeposits after 1 minute of deposition without electrolyte additives.

FIG. 1F: atomic force microscopy (AFM) of electrodeposits presented in FIG. 1E.

FIG. 1G: SEM of metal electrodeposits after 1 minute of deposition with 0.1 wt. % PVA dissolved in the plating solution.

FIG. 1H: AFM of electrodeposits presented in FIG. 1G. For the samples measured in FIGS. 1E-1H, a voltage of −0.8 V versus Ag/AgCl was applied to platinumized ITO working electrodes. Note the scale bar difference in FIGS. 1F and 1H.

FIG. 2A: transmittance spectra of 5 cm×5 cm dynamic window without additive.

FIG. 2B: transmittance spectra of 5 cm×5 cm dynamic window with 0.1 wt. % PVA after four different deposition times.

FIG. 2C: transmittance at 550 nm (where the human eye is most sensitive) versus time for 120 seconds of metal deposition;

FIG. 2D: the charge density versus time required for the deposition.

FIG. 2E: coloration efficiency at 550 nm versus contrast ratio calculated with data in FIGS. 2C-2D. A plating voltage of −0.8 V was applied to the dynamic window for three minutes to elicit metal deposition.

FIG. 10A: reflectance spectra of the window with the control electrolyte (without any additives).

FIG. 10B: reflectance spectra of the window with 0.1 wt. % PVA. The window with the PVA additive is more reflective due to the smoother metal morphology.

FIG. 24A is with 0% HEC and FIG. 24B is with 2% HEC. In each case, deposition was at −0.4 V for 120 seconds with a Ag reference electrode. SEM was performed at operating voltage of 5 kV.

FIGS. 29A-29C show SEM images of metal electrodeposits plated on a Pt-ITO electrode from a Bi—Cu halide electrolyte. FIG. 29A shows such with no polymer additives, FIG. 29B shows such with 0.1 wt. % PVA, and FIG. 29C shows such with 0.1 wt. % PVP. In each case, tinting was at −0.8 V for 60 seconds with a Ag/AgCl reference electrode. SEM was performed at an operating voltage of 5 kV.

The drawings and figures are not necessarily drawn to scale, unless otherwise indicated, but instead are drawn to provide a better understanding of the components, and are not intended to be limiting in scope, but to provide exemplary illustrations.

DETAILED DESCRIPTION

Figure 1A:
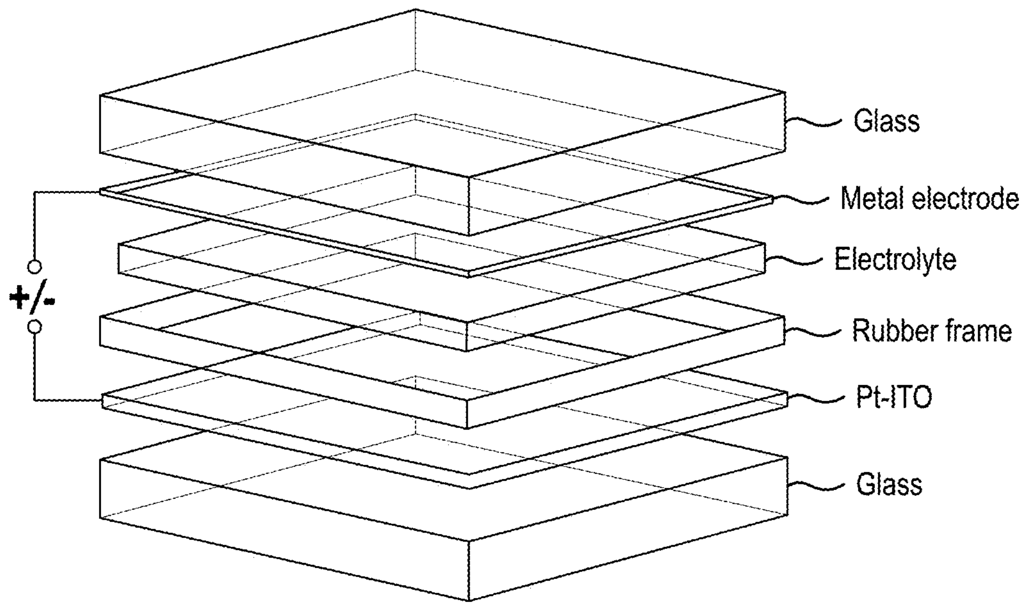
FIG. 1A: expanded schematic view of an exemplary dynamic window.

The present disclosure relates to reversible metal electrodeposition (RME) for use in dynamic windows and similar devices, examples of which include, but are not limited to windows, greenhouses, electric and other vehicles, transition sunglasses, goggles, tunable optics, clear-to-black monitors or other displays, adjustable shutters, IR modulators, thermal camouflage, and the like. As shown in FIG. 1A, an exemplary metal-based dynamic window device may typically include a transparent electrode, a counter electrode, with an electrolyte layer sandwiched therebetween. Glass layer(s) may also be present, as suggested in FIG. 1A. The electrolyte layer includes metal cations that are substantially colorless (i.e., provide substantially no tint) when in solution, but provide tinting when a cathodic (reducing) potential is applied to the transparent electrode (e.g., a tin oxide such as indium tin oxide ("ITO")), resulting in deposition of metal atoms from the electrolyte onto the transparent electrode surface, resulting in a tinting of that surface. So long as the electrical potential is maintained, metal atoms continue to plate on the surface, and the window progressively tints. Once a desired level of tint is achieved, the electrical potential may be removed and the tint is maintained. When the polarity applied to the electrodes is reversed, the deposited metal atoms are oxidized, dissolving back into the electrolyte layer, returning the window to its transparent state. It is important that the transparent electrode is configured to allow stripping of the electrodeposited metal layer. For example, this differs from U.S. Pat. No. 9,383,619 to Kim, in which the electrode is surface treated (e.g., with an oxygen plasma followed by silane treatment), to interfere with the ability to strip away the electrodeposited metal layer. In an embodiment, no such oxygen plasma and/or silane or similar treatments of the transparent electrode(s) are performed to increase affinity between the electrode and the electrodeposited metal layer, in a manner that would prevent subsequent reversal (i.e., stripping).

An important aspect of the present disclosure is directed to addition of select additives for inclusion in the electrolyte solution layer between the electrodes. Such additives serve to improve the surface morphology of the metal layer as it grows during electrodeposition, e.g., improving surface smoothness, density, particle size, etc. Such additives may enhance the resulting dynamic window's color neutrality, transmittance of visible light wavelengths (e.g., ability to achieve a near 0% transmissivity to provide an effective "full blackout privacy state"), infrared reflectance (e.g., affecting solar heat gain), or switching speed. By way of example, the morphology of the deposited metal film affects such properties, and additives selected for inclusion in the electrolyte layer are selected for their ability to affect such morphology.

Examples of such additives that may be suitable for use may be known as levelers, inhibitors, or accelerators, as used in plating baths used in the manufacture of microelectronic devices, where deposition of metal atoms is permanent (e.g., when forming a conductive copper tracing or the like for a microelectronic device). Examples of such additives include, but are not limited to various polymeric and other additives, examples of which include polyols (e.g., polyvinyl alcohol or polyethylene glycol), amine-based polymers (e.g., polyvinylpyrrolidone), or cellulose derivatives (e.g., hydroxyethyl cellulose). While such additives may have been used to some extent in manufacture of microelectronic devices, where a permanent conductive tracing or similar structure is being deposited onto a silicon or similar semiconductive substrate, such additives have not been used to any significant extent in reversible metal electrodeposition electrolytes, particularly in the context of RME dynamic windows. A wide variety of such additives may prove suitable for use, e.g., so long as they are stable in the presence of other components present in the electrolyte, and they do not attack or degrade the transparent electrode or counter electrode or glass layer(s) between which the electrolyte is sandwiched. For example, it can be important that the selected morphology adjusting additive be compatible with any anion selected for inclusion in the electrolyte, as described in Applicant's U.S. Patent Application No. 62/968,502 and PCT Application No. PCT/US2021/015851, each of which is titled ELECTROLYTE FOR DURABLE DYNAMIC GLASS BASED ON REVERSIBLE METAL ELECTRODEPOSITION, filed Jan. 31, 2020 and Jan. 29, 2021, respectively, each of which is herein incorporated by reference in its entirety.

Polyols, amine-based polymers, cellulose derivatives, and other exemplary suitable additives when in the electrolyte solution as contemplated herein are colorless, preferably non-toxic, relatively inexpensive, and electrochemically stable, so as to be compatible with reversible electrodeposition chemistry, where the metal ions in the electrolyte may be repeatedly deposited, and stripped away, over thousands of cycles, over years of use in such a dynamic window. The requirements for reversible electrodeposition chemistry as contemplated herein are more stringent than for typical plating baths as used in microelectronics manufacture, as the system must be configured to support reversible metal film growth and dissolution over thousands of cycles, with no significant degradation within the system, from one cycle to another. For example, in typical plating baths, chloride ions are added to serve as a bridge between the metal being deposited and the polymer or other additive, as such inhibitors are generally ineffective without the inclusion of chloride ions. As described in the above referenced U.S. and PCT Patent Applications, such chloride ions can be undesirable in the present reversible systems, as they lead to formation of insoluble compounds, and can lead to degradation of the electrodes in such an RME dynamic window system, after prolonged cycling. Thus, in an embodiment, the electrolytes contemplated herein are substantially void of chloride (Cr) ions, other halide ions, or so called pseudo-halide ions (e.g., cyanide ions or thiocyanate ions). Where such ions may be present, in an embodiment, they may be present in a molar concentration ratio relative to the metal cation that is 5:1 or less, 4:1 or less, 3:1 or less, 2:1 or less, 1:1 or less, 0.5:1 or less, or 0.1:1 or less. The vast majority (e.g., at least 60%, at least 70%, at least 80%, at least 90%, or at least 95%) of the electrolyte solution may comprise water (e.g., the balance of the electrolyte solution may be water, beyond the various components detailed herein). As described in the above referenced application, in an embodiment, the electrolyte may include perchlorate ($ClO_4$) ions, which do not exhibit such problems, but still increase the ionic conductivity of the electrolyte solution. The choice of solvent, electrolyte, metals, and supporting ions can be important for building a high-performance system that achieves reversible metal film growth and dissolution over thousands of cycles, as the requirements for reversible electrodeposition chemistry are more stringent than for typical plating baths. For example, in the case of a PVA additive, the polyol hydroxyl groups can strongly adsorb to oxide surfaces and thus are effective inhibitors despite the absence of $Cl^-$ or other halide ions in the electrolyte solution.

As described in the previously referenced application, various metal cations may be employed for reversible electrodeposition. In an embodiment, at least one of copper (e.g., $Cu^{2+}$) or bismuth (e.g., $Bi^{3+}$) are employed. Numerous other metals (e.g., transition metals in the periodic table) may also be suitable for use. Copper and bismuth exhibit similar standard reduction potentials (i.e., +0.337 V and +0.308 V, respectively). When used together, copper and bismuth exhibit synergy during electrodeposition that improves the reversibility of the system. By way of example, where two such metals are employed, their standard reduction potentials may be within 25%, within 20%, within 15%, or within 10% of one another. It will be apparent that other metal cations may also be suitable for use as the plating cation(s). The metal cation component (e.g., $Cu(ClO_4)_2$, $BiOClO_4$ or the like) may be included in concentration of at least 0.1 mM, 1 mM, or 5 mM, up to 10M, up to 5M, or up to 1M, such as from 1 mM to 100 mM, or 1 mM to 50 mM.

By way of example, the electrolyte solution may also contain a component configured to increase ionic conductivity. $LiClO_4$ is an example of such. By way of non-limiting example, an exemplary electrolyte may include 10 mM $Cu(ClO_4)_2$, 10 mM $BiOClO_4$, 10 mM $HCl_4$, 1M $LiClO_4$, and a small amount of one or more of the additives described herein, in water (e.g., deionized water). In an embodiment, the morphology adjusting additive may be included in an amount of at least 0.001%, such as from 0.01% to 10%, or from 0.1% to 1% by weight of the electrolyte solution.

A polymer additive may be of any suitable molecular weight, e.g., of up to 10 million Daltons, up to 5 million Daltons, or up to 1 million Daltons, such as greater than 1,000 Daltons, from 5,000 Daltons to 1 million Daltons, from 10,000 Daltons to 1 million Daltons, from 30,000 Daltons to 500,000 Daltons, from 30,000 Daltons to 250,000 Daltons, or from 40,000 Daltons to 100,000 Daltons. Molecular weight values may be reported as number average or weight average molecular weights. By way of further non-limiting example, an exemplary polymeric additive (e.g., PVA or otherwise) may have a weight average molecular weight of 61,000 Daltons. Relatively lower molecular weight additives will typically exhibit greater solubility, and may result in lower viscosity for the electrolyte solution.

Inclusion of the additive may decrease the surface roughness of the deposited metal film layer, resulting in a deposited layer that is less porous (e.g., less formation of dendrites), smoother, more dense, of more uniform morphology, with generally smaller particles (e.g., generally spherical), where the particles exhibit a relatively narrow size distribution, as compared to a similar electrolyte, but without the additive.

Figure 1B:
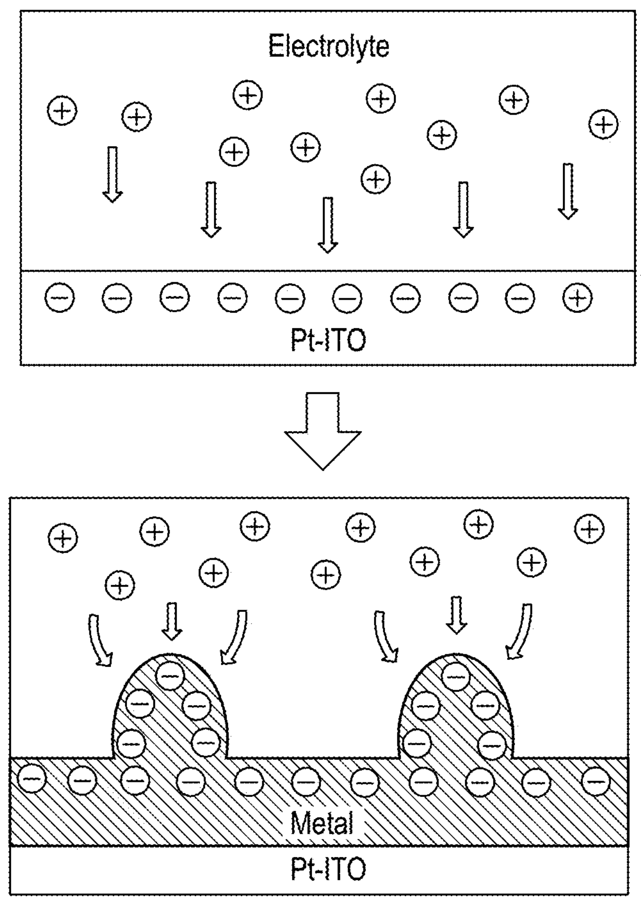
FIG. 1B: schematic illustration of dendritic metal electrodeposition that occurs without electrolyte additives as described herein.
Figure 1C:
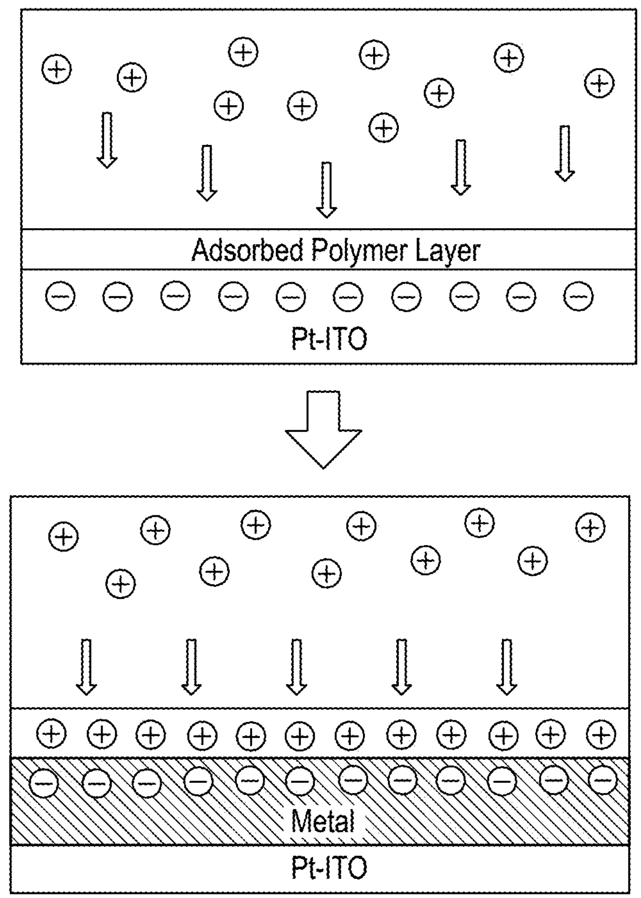
FIG. 1C: schematic illustration of how adsorbed polymer inhibitors promote smooth metal electrodeposition.
Figure 1D:
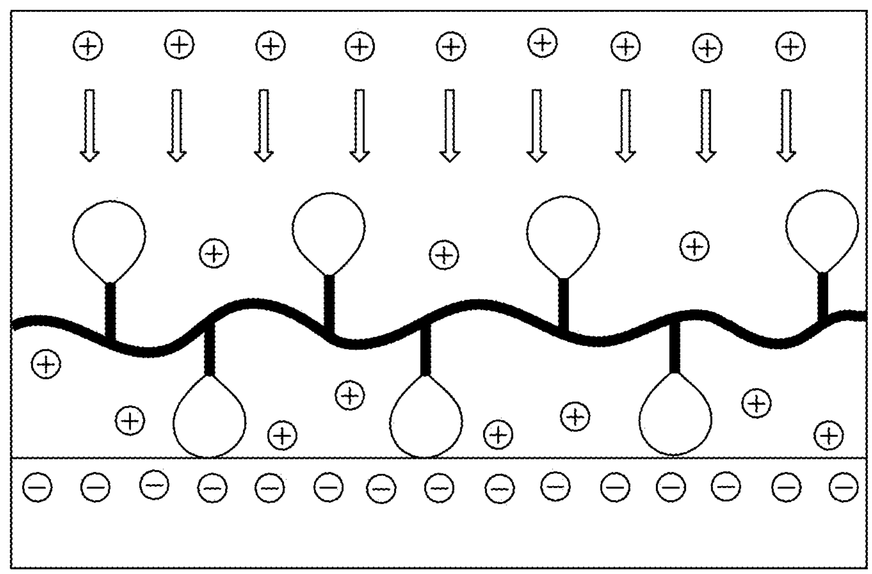
FIG. 1D: magnified view of electrode-electrolyte interface with an adsorbed polyol inhibitor or similar additive. The polymer adsorbs to the electrode and homogenizes the flux of metal cations to the plating surface.

FIGS. 1B-1D schematically illustrate deposition mechanisms for the present systems. While there remains some debate over the mechanism by which polymer inhibitors work, most studies agree that the effect on the metal morphology stems from adsorption of the additive molecules on the electrode surface. In this mechanism, the polymers form an adsorbed monolayer on the electrode that aids in achieving uniform plating. According to the prevailing Chazalviel space charge model, when metal electrodeposition is diffusion-limited (as is the case for the dilute metal concentrations used for dynamic windows) the concentration of ions drops to zero near the electrode surface and the localized electric fields that form at inhomogeneities cause ramified growth or what is loosely termed dendritic electrodeposition (FIG. 1B). With the adsorbed polymer layer, however, the space charge remains distributed rather than localized over the surface and electrodeposition occurs uniformly through competition for adsorption sites between the metal cations and polymer side groups (FIG. 1C). The polymer gains positive charge from the metal ions in solution that coordinate with the polymer, and this charged layer polarizes the electrode and homogenizes the ion flux. FIG. 1D shows a magnified view of the electrode-electrolyte interface with an adsorbed polymer additive as described herein (e.g., a polyol inhibitor). The polymer adsorbs to the electrode and homogenizes the flux of metal cations to the plating surface.

When the electrolyte does not include such an additive, the metal tinting or opacifying layer that is reversibly deposited onto the interior surface of the transparent electrode tends to be formed from relatively tall, narrow metal pillars with a wide size distribution, and low surface coverage (i.e., discontinuities included therein), as shown in SEM images and AFM measurements (e.g., see FIGS. 1E-1F). With the addition of a small amount of an additive as contemplated herein (e.g., 0.1% by weight of PVA), the resulting reversible deposition metal layer is far smoother (e.g., RMS surface roughness of less than 30, less than 25, less than 20, less than 15, less than 10, or even less than 5 nm). In addition to such improved smoothness, the surface also exhibits an overall more uniform morphology (e.g., see FIGS. 1G-1H).

When including such an additive, the polymer layer formed from the additive polarizes the electrode, and introduces an additional energy barrier to nucleation (i.e., an increase in overpotential). Such results in a decrease in deposition rate (but with increased overall smoothness, and more uniform surface morphology) as the metal ions must diffuse through the charged polymer additive layer and compete with the polymer for adsorption sites on the electrode surface.

As described herein, molecular weight and/or concentration of the polymer or other additive can be varied within a fairly wide range, while still providing effective control over resulting surface morphology. While a wide range of molecular weights may prove suitable for use as an additive as contemplated herein, in an embodiment, it may be advantageous for the additive to have a molecular weight of no more than 250,000 Daltons, or no more than 100,000 Daltons, as such lower molecular weight additives may be more easily dissolved, and may result in relatively lower viscosities for the electrolyte solution.

The additive may be included in an amount of at least 0.001%, (1000 ppm) such as from 0.01% to 10%, or other ranges as disclosed herein. Even lower concentrations may prove suitable for use, such as at least 10 ppm, or at least 100 ppm, as such levels may still be sufficient to meet a threshold critical limit for surface coverage of the transparent electrode where electrodeposition occurs. The electrolyte may be relatively insensitive to additive concentration, so long as the threshold critical limit for surface coverage is met. By way of example, for a polyol, the critical limit may be estimated by calculating the number of hydroxyl groups in solution provided by such a polyol additive, compared to the number of adsorption sites on the electrode surface. For a 0.1% polymer additive concentration, the number of hydroxyl groups in solution may far exceed the number of adsorption sites, e.g., by about 5 orders of magnitude. As such, it will be apparent that relatively small concentrations of the additive may be sufficient to achieve the desired inhibitor result. It will be apparent that concentrations far lower than 0.1% may be suitable for use (e.g., such as 0.01%, 0.001%, or even lower values, of 100 ppm, or less, so long as sufficient additive is provided for surface coverage to achieve the desired inhibition). While described in the context of a polyol inhibitor, it will be appreciated that analogous considerations may apply for an accelerator additive, or a leveler additive. A wide variety of additives and concentrations thereof may be suitable for use so long as the selected additive(s) are capable of enhancing the surface morphology (e.g., increased density (i.e., reduced porosity) to the deposited metal layer, increased smoothness, increased uniformity in particle sizes, etc.), so as to provide good color neutrality, near 0% transmission of visible light wavelengths associated with a full blackout privacy state, high infrared reflectance, and/or fast switching speed for the dynamic window incorporating such an electrolyte.

In an embodiment, a polyol additive (e.g., such as PVA) may be advantageous, as it may exhibit improved compatibility with a perchlorate or other selected anion, as compared to various nitrogen containing additives (such as PVP), or cellulose derivative additives (such as HEC). While PVA is an example of a particularly suitable additive, it will be appreciated that other polymers, or even non-polymer small molecule additives may also be suitable, where such other additives exhibit a similar ability to control morphology of metal growth during reversible metal electrodeposition.

Additives known in electroplating as inhibitors may act to create and maintain a stable diffusion layer that promotes smooth and dense electrodeposition. Such additives may also sometimes be referred to as suppressors in the electroplating art. Non-limiting examples of such additives include various polyols (e.g., PVA, PEG, PAG, and the like), amine-based polymers (PVP, PEI, and the like), and cellulose derivatives (HEC, MPC, EC, and the like). Those of skill in the art will appreciate that numerous other examples are also possible.

Additives known in electroplating as accelerators may typically be sulfur-containing compounds. Accelerator additives serve to block high potential sites (i.e. defects), forcing the metal ions to plate elsewhere. Such additives may also sometimes be referred to as brighteners in the semiconductor art. Non-limiting examples of such additives may include organic sulfides, disulfides, thioethers, thiocarbamates, as well as other sulfur-containing compounds capable of blocking defect sites to metal deposition. Specific examples of accelerator additives include, but are not limited to bis-(sodium sulfopropyl)-disulfide ("SPS").

Additives known in electroplating as levelers may typically be quaternary nitrogen compounds. Leveler additives serve to block high potential sites (i.e. defects), in a similar manner as accelerators, yielding smoother electrodeposited films. Non-limiting examples of such additives may include but are not limited to quaternary nitrogen compounds (e.g., ammonium salts) such as cetyltrimethylammonium bromide, Janus Green B, and triethyl-benzyl-ammonium chloride. It will be appreciated that more than one additive, including combinations of different types of additives, may be employed.

Various other organic or inorganic molecules capable of providing similar adjustment to the morphology of the electrodeposited metal layer may also be useful as suitable additives. An example of such may be sodium citrate. Others will be apparent to those of skill in the art, in light of the present disclosure.

Figure 2A:
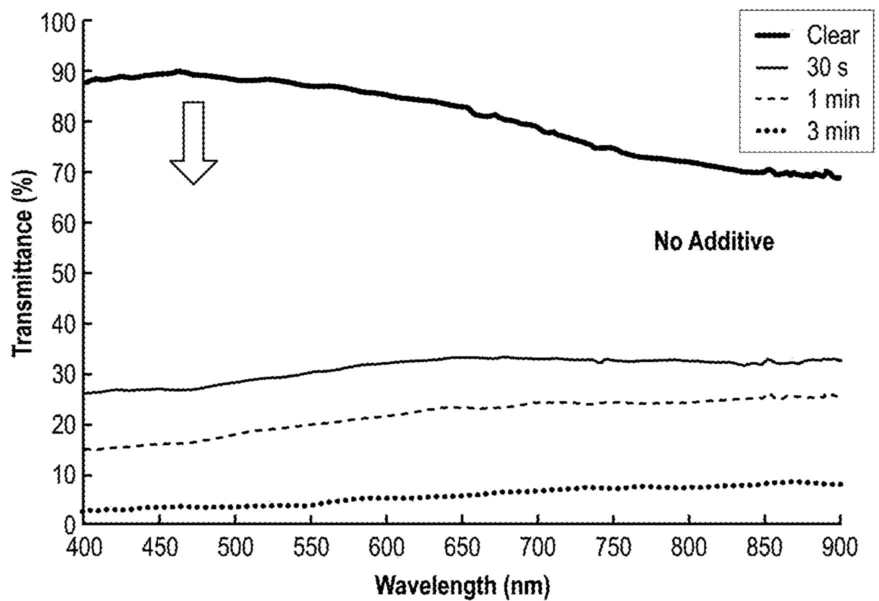
FIGS. 2A-2E show various transmittance spectra.
Figure 2B:
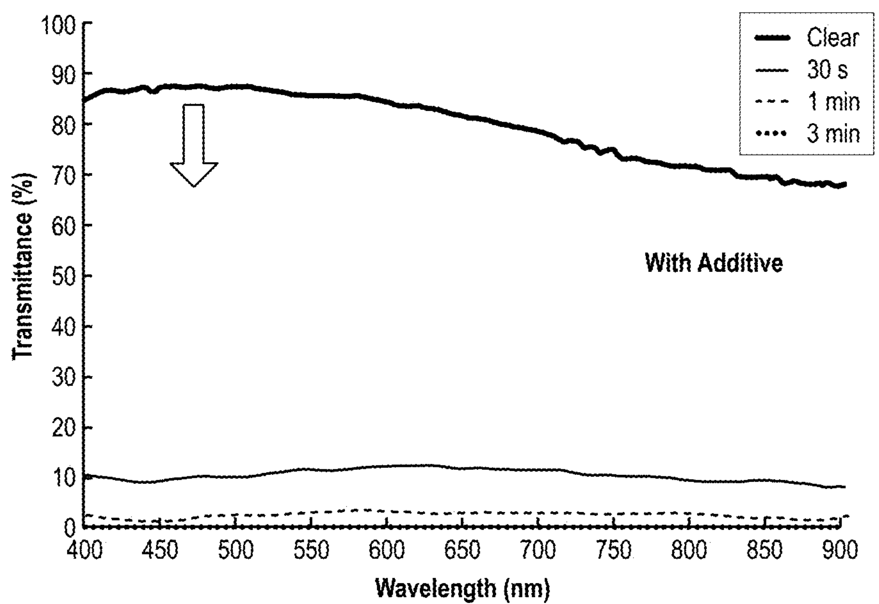

FIGS. 2A-2B illustrate how inclusion of an additive as contemplated herein can improve the speed at which tinting occurs (e.g., transmittance through the window drops faster), and can increase the maximum degree of tinting finally achievable within a reasonable time frame (e.g., 20 minutes, 10 minutes, 5 minutes, 3 minutes, or even faster, such as 1 minute or less). By way of example, as shown in FIG. 2B, transmittance of visible light wavelengths once fully tinted (after 3 minutes in this example) can be near 0% (e.g., 1% or less, 0.1% or less, 0.01% or less, or 0.001% or less). Because the additive serves to inhibit plating as described, it is surprising that the addition of the additive can actually speed up tinting.

Figure 2C:
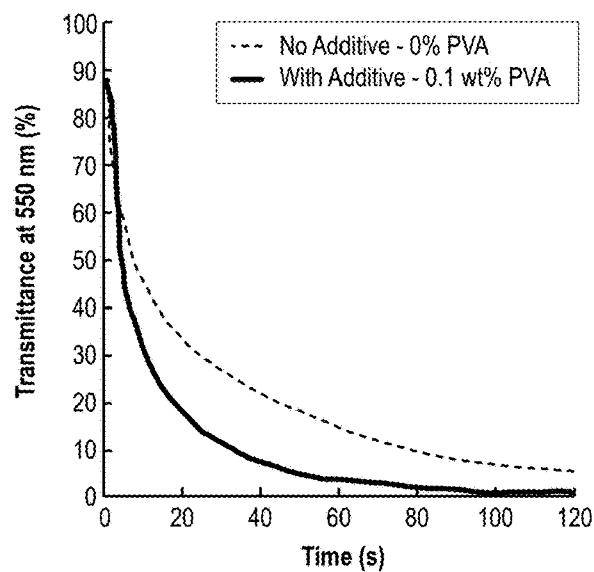
Figure 2D:
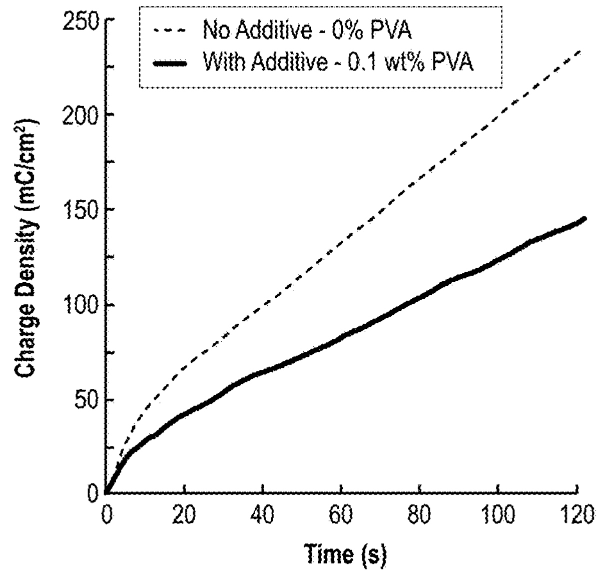
Figure 2E:
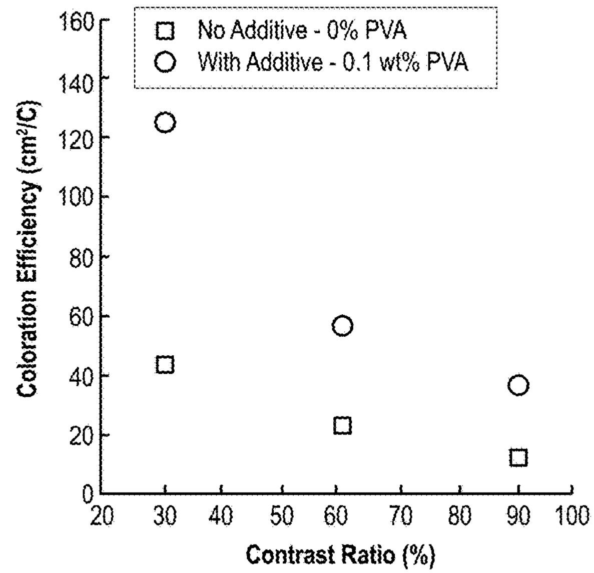

Inclusion of such an additive can also improve the efficiency of the resulting window, e.g., reducing the rate of charge consumption for the window, where such an additive is included in the electrolyte solution. FIGS. 2D-2E illustrate such an effect. The lower charge consumption and increased switching speed gives the resulting window a coloration efficiency (defined as change in optical density over a fixed area per unit charge) that is significantly higher (e.g., 2-3× higher) than a comparable window, where the electrolyte does not include such an additive.

Figure 10A:
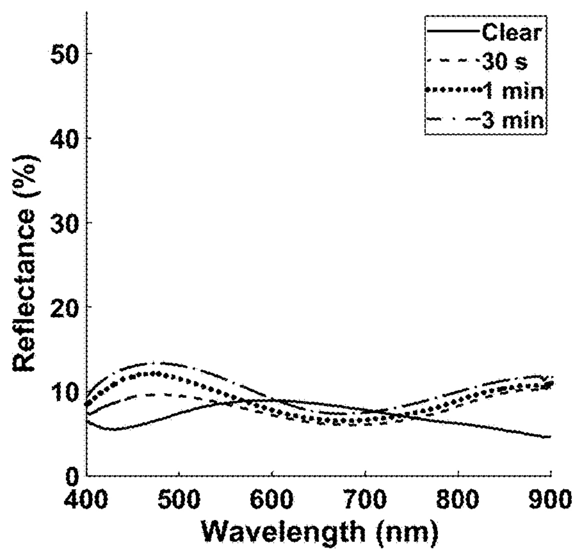
FIGS. 10A-10B show reflectance spectra of windows with active area of 25 $cm^2$ after 1 minute of tinting at a potential of −0.8 V.

As shown in FIG. 10A, in addition to improved switching speed, a full blackout privacy state (near 0% transmission when tinted), and improved efficiency, inclusion of the additive also can improve heat rejection of the resulting window. For example, when such an additive is not present, the porous, discontinuous film allows light to be transmitted through the gaps between metal deposits. The morphologically "spiky" particles seen in FIG. 1F also result in increased scattering and absorption for the resulting film. Such scattering and absorption results in poor heat rejection, as infrared wavelengths in particular are absorbed. The additive slows down plating rate, but improves switching speed, as the resulting film is smoother, denser, and more uniform, better able to reflect incident infrared wavelengths that would result interior heating (which may be undesired in at least some circumstances). Furthermore, the additives allow tuning between reflective (good heat rejection) and absorptive (good heat retention) states, as in some cases it may be desirable to absorb heat rather than reflect it (e.g., in cold winter weather climates).

Figure 3A:
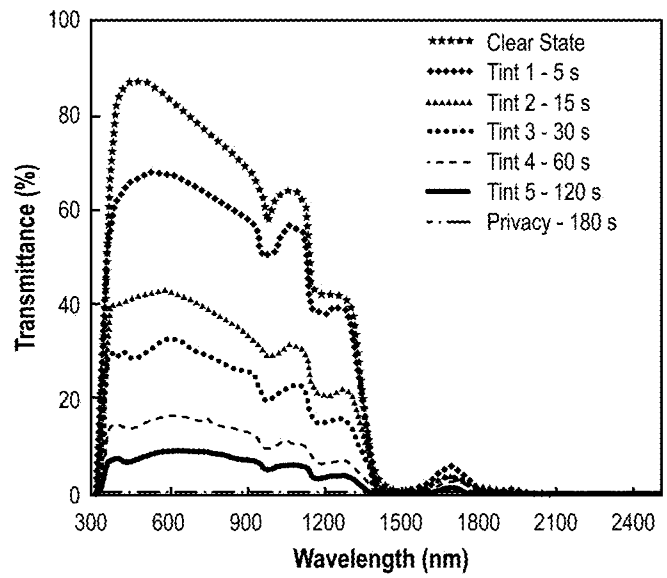
FIG. 3A: transmittance spectra of metal-based dynamic windows for seven distinct optical states and the switching times required to achieve each state.
Figure 3B:
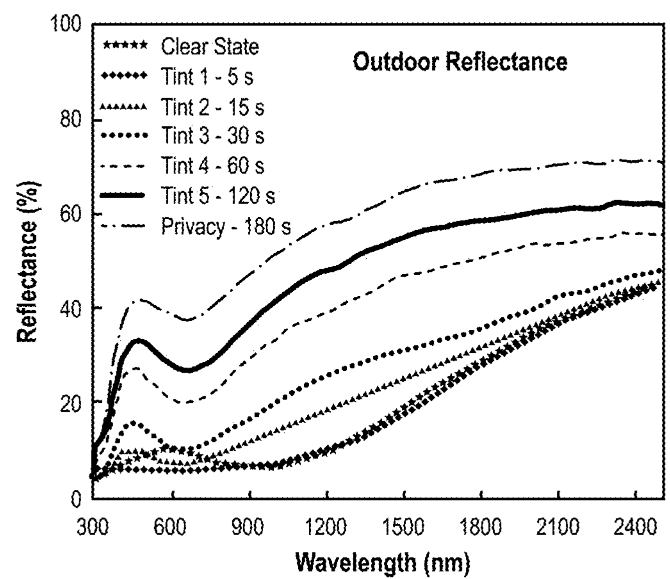
FIG. 3B: reflectance spectra measured through the ITO-on-glass electrode where the metal film initially forms for the seven optical states (outdoor reflectance).
Figure 3C:
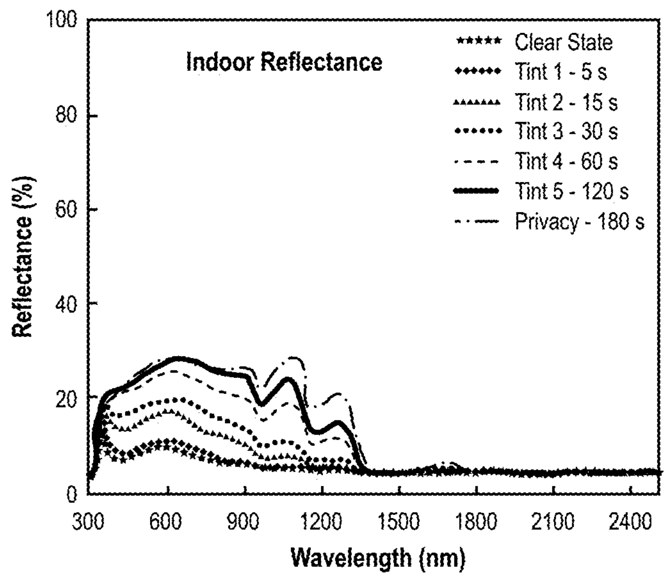
FIG. 3C: reflectance spectra measured through the metal counter electrode that samples the top surface of the deposited metal films (indoor reflectance).

In addition to performance parameters noted above, visible light transmittance ("VLT"), solar heat gain coefficient ("SHGC"), and chroma (to what degree the window is "color neutral" as it tints) are also important performance characteristics, which can be improved where the electrolyte includes an additive as contemplated herein. The present metal-based dynamic windows can provide VLT, SHGC and chroma characteristics that are equal to or better than that provided by existing technologies. FIGS. 3A-3C show transmittance ("T") and reflectance ("R") across the wavelength range of 300 to 2500 nm (e.g., generally corresponding to the relevant bandwidth for solar radiation). Such figures show transmittance and reflectance for various optical states for a dynamic window, from its "clear" state to a "privacy" state, through progressively tinted optical states.

Transmittance in the clear state is generally dictated by transmittance through the ITO or other transparent electrode, and the aqueous electrolyte, along with the two outer layers of glass or other glazing material (e.g., plastic, such as plexiglass). The overall shape of the transmittance curve is maintained as the window tints because the electroplated metal film blocks light generally uniformly across the solar spectrum. The full blackout privacy state with near 0% transmittance is a distinct advantage of the present embodiments over commercially available competing technologies, which do not provide such low, near 0% transmittance (i.e., effectively providing blackout curtains in the dynamic window). As noted above, this near 0% transmittance is facilitated by inclusion of an appropriate additive in the electrolyte, which allows the metal to deposit as a dense, rather than porous layer.

The reflectance in the clear state is primarily dictated by the ITO or other transparent electrode that serves as a low-emissivity coating that transmits visible light, while reflecting infrared wavelengths (e.g., $\lambda$>700 nm, such as 700 nm to 2500 nm, or 700 nm to 1200 nm). Reflectance of the dynamic window increases across the solar spectrum as the window tints, because the metal film becomes more reflective as it grows, particularly on the exterior face of the window. The exhibited high infrared reflectance (e.g., at least 30%, at least 40%, at least 50%, at least 60%, or at least 70%) of wavelengths in the range of 700 to 1200 nm is particularly important for energy control, as about half of all incident solar energy is in this regime. As noted above, where it may be desirable to absorb heat rather than reflect it, the additive and other electrolyte solution constituents can be selected and particularly configured to achieve such.

In addition, FIGS. 3B-3C show how the reflectance properties of the dynamic windows may differ with viewing direction (i.e., from inside to outside of the window, vs. from outside to inside the window). Generally speaking, the surface where the metal nucleates (e.g., the ITO electrode) is more reflective, while the opposite top surface may be more absorptive, providing a "matte" appearance. In an embodiment, the reflective surface can be oriented towards the exterior of the building, where it can more efficiently reject light and heat, while the absorptive "matte" surface may be oriented inwardly for a more desirable aesthetic.

Figure 3D:
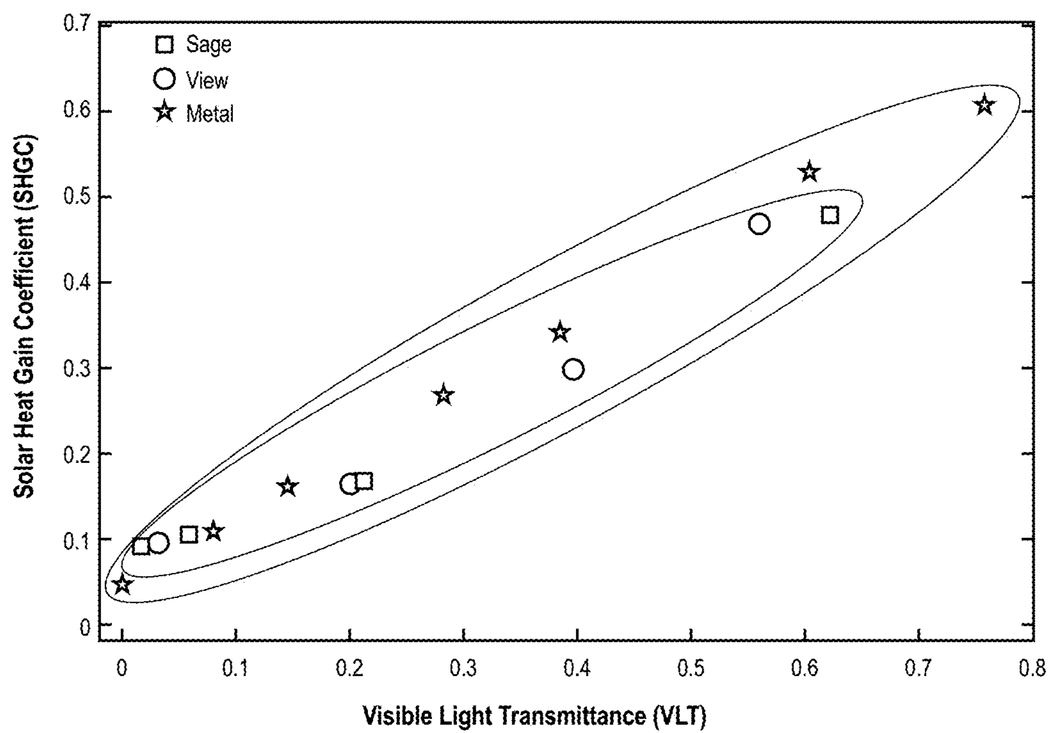
FIG. 3D: solar heat gain coefficient (SHGC) versus visible light transmittance (VLT) for the optical range of metal-based dynamic windows (Metal) compared to industry leaders Sage Glass (Sage) and View, Inc. (View).

Returning to VLT and SHGC, VLT refers to the fraction of light in the visible spectrum (e.g., from about 400 to 700 nm) that passes through the window, while SHGC refers to the percentage of solar radiation that enters a building through the window. A higher SHGC is generally desirable in cold climates, while a low SHGC is desired in hot climates. Traditional static windows employ a spectrally-selective stack of metal films and anti-reflection layers to maximize transmittance of visible light wavelengths, while reflecting infrared wavelengths. However, such static windows do not provide any way to adjust to an outdoor environment that is in flux. FIG. 3D shows SHGC and VLT characteristics for state of the art dynamic windows available from Sage Glass and View, Inc. FIG. 3D also plots the SHGC and VLT characteristics for examples of the presently contemplated metal-based dynamic windows, which are capable of operating over a wider range of SHGC and VLT combinations. Such dynamic windows allow a user to adjust the optical properties (SHGC and/or VLT) according to the local climate, or seasonal conditions. It is a further advantage that such changes to the optical properties of the dynamic window are achievable with relatively modest power consumption, to alter the thickness of the reversibly deposited metal layer.

Figure 3E:
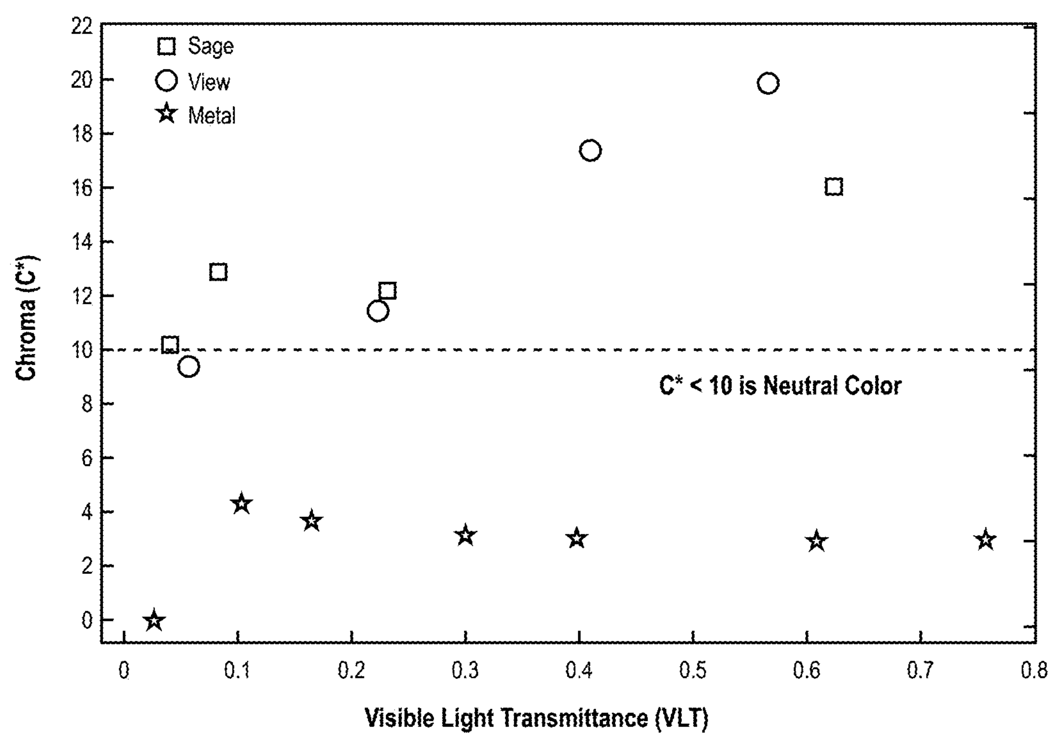
FIG. 3E: chroma (C*) versus visible light transmittance (VLT) with the condition for neutral color indicated. All optical data for the Sage and View windows in FIGS. 3A-3E were obtained from a public database (IGDB v29.0).

Color associated with windows is another important consideration. One drawback of existing dynamic window technologies is that such windows are not particularly color neutral, but appear somewhat yellow when clear, and exhibit a blue color shade as they tint. Chroma (C*) is a measure of color in the CIE L*a*b* color space, often used to evaluate color or chromatic characteristics. When C* is <10, the human eye has difficulty distinguishing the color of the object, and it is perceived as a neutral gray. As shown in FIG. 3E, the present metal-based dynamic windows are able to achieve C* of less than 10, less than 8, or even less than 5, over the entire operative VLT range. As shown in FIG. 3E, state of the art dynamic windows do not provide such color neutral operation. Of course, the neutral color characteristics of the present windows may be referenced to a* and/or b*, where C* is equal to the square root of the sum of $(a^*)^2+(b^*)^2$. For example, in an embodiment, the dynamic window may achieve color neutral characteristics with the absolute value of a* and/or b* of less than 5, over an operative VLT range of the dynamic window.

Another advantage of the present use of the contemplated additives is with respect to minimizing voltage drop across a large (e.g., 1 $m^2$ or more) dynamic window transparent electrode, so as to achieve substantially uniform tinting across the window. Existing dynamic windows reduce switching speed, lowering current density requirements, to achieve more uniform tinting over such large windows. By way of example, such windows often take about 20 minutes to transition across their full optical range. It is an advantage to be able to provide a full available tinting transition within a faster time period, e.g., with 15 minutes, within 10 minutes, within 5 minutes, within 3 minutes, within 2 minutes, within 1 minute, within 30 seconds, or within 15 seconds. For example, use of additives as described herein may allow switching from a clear window to a full blackout privacy state within as little as 15 seconds.

Dynamic windows based on RME enable a unique strategy for reducing resistance of the electrode, as metals are generally excellent electrical conductors, and deposition of a continuous film across the electrode decreases the resistance of the electrode as the film grows thicker, if the film is substantially continuous. This approach is not possible with earlier generation RME windows, because the metal electrodeposits were not particularly continuous, but relatively isolated and discontinuous or porous, as shown in FIGS. 1E-1F. As shown in FIGS. 1G-1H, with the inclusion of the additive as contemplated herein, the deposited film is far more continuous and less porous, resulting in increased electrode conductivity as the window tints. FIGS. 4A-4E plot such properties of current density, charge density, sheet resistance, voltage drop, and shows the relatively uniform transmittance that results from the presently contemplated dynamic windows. Such windows also show increased durability (e.g., >1000 cycles) of a copper or other conductive mesh counter electrode embedded in such a dynamic window, where the electrolyte includes a small amount of additive (e.g., PVA). For example, FIGS. 4G-4H of the provisional Application, already incorporated by reference, show photographs comparing the durability of such a copper mesh counter electrode both with, and without the additive.

In an embodiment, the counter electrode is a nonpolymeric electrode, such as a metallic electrode. For example, in an embodiment, the counter electrode may be a highly conductive material, rather than comprising a relatively poorly conducting polymeric conductive material (e.g., polyaniline, polypyrrole, polythiophene or derivatives or mixtures thereof). In addition to exhibiting lower conductivity, such polymeric counter electrodes are typically not color neutral, interfering with the ability to achieve excellent color neutrality as described herein.

EXAMPLES AND EXPERIMENTAL RESULTS

Methods

Chemicals were received from commercial sources and used without further purification. Electrochemical studies were carried out using a SP-150 Biologic potentiostat. For experiments utilizing three electrodes, electrochemical potentials were measured and reported in reference to a "no-leak" Ag/AgCl (3 M KCl) reference electrode (eDAQ). ITO-on-glass transparent electrodes with a sheet resistance of 10 Ω/sq (Xinyan Technology Ltd.) were cleaned by ultrasonication in de-ionized $H_2O$ with 10% Extran solution for 10 min, acetone for 5 min, and isopropanol for 10 min, sequentially. Next, the electrodes were dried under a stream of $N_2$ or air and then placed in a UVO-cleaner (Jelight Company Inc, Model No 42) for 10 min to remove organic contaminants. To form the Pt-ITO electrodes, an aqueous dispersion of 1000 ppm Pt nanoparticles with 3 nm average diameter (Sigma-Aldrich) was diluted 10:1 with deionized water and then spray deposited with a 20 mm 113 kHz Ultrasonic Mist Atomizer (WHDTS) onto the ITO-on-glass electrodes. Then, the electrodes were annealed in air at 250° C. for 20 minutes before use. The sub-monolayer of 3-nm-diameter Pt nanoparticles for promoting uniform nucleation of the metal electrodeposits does not affect the optical or electrical properties of the ITO in any significant way. The ITO electrode used is merely exemplary, and it will be appreciated that other transparent electrodes could additionally or alternatively be used.

The immersed geometric surface area of the working electrode was 1.0 $cm^2$ for the three-electrode experiments. Spectroelectrochemical measurements were performed in a 4.5 cm by 2.0 cm by 1.0 cm glass cuvette (G205, Labomed, Inc.) in a three-electrode configuration with Pt-modified ITO-on-glass as the working electrode, a Pt wire counter electrode, and a "no-leak" Ag/AgCl (3 M KCl) reference electrode (eDAQ). The perchlorate electrolyte comprised 10 mM $Cu(ClO_4)_2$, 10 mM $BiOClO_4$, 10 mM $HClO_4$, and 1 M $LiClO_4$ dissolved in deionized water. The halide-based electrolyte comprised 15 mM $CuCl_2$, 5 mM $BiCl_3$, 10 mM HCl, and 1 M LiBr dissolved in deionized water. The various polymer additives tested included polyvinyl(alcohol), polyethylene glycol, polyvinyl pyrrolidone, and hydroxyethyl cellulose. All the polymers were purchased from Sigma-Aldrich as powders, and polymers with variable molecular weight were obtained for the relevant experiments. All polymers were dissolved in the control electrolyte by placing a vial of electrolyte with an immersed PTFE stir bar on a hot plate set to 60° C. and 1200 RPM for 1 hour. The concentration of polymer in solution varied from 0.1 wt. % to 10 wt. % and was a variable of study.

Small-scale dynamic windows used for the optical performance characterization were constructed with 5 cm×5 cm Pt-modified ITO on glass and a Cu foil frame around the edge (see FIG. 1A for schematic). The electrolyte for the small-scale windows was the control electrolyte with 0.1 wt. % PVA (Mw=61,000). Butyl rubber Solargain edge tape with a thickness of 2 mm and a width of 5 mm (Quanex Inc.) served as the frame of the dynamic windows. Conductive nylon tape (ElectricMosaic, Z22) enabled electrical contact to the perimeter of the ITO electrode. The total window thickness was 5 mm.

Large-scale dynamic windows comprised the same layers with the exception of a Cu mesh electrode used in place of the Cu foil frame. The windows were constructed with 30 cm×30 cm Pt-modified ITO-on-glass or 5 cm×15 cm Pt-modified ITO on glass and transparent Cu mesh (TWP, Inc., wire diameter: 0.0012 in) as the electrodes. The electrolyte for the prototypes had the same components as the control electrolyte with the concentration of the $Cu(ClO_4)$ and the $BiOCl_4$ diluted to 5 mM. Butyl rubber Solargain edge tape with a thickness of 2 mm and a width of 5 mm (Quanex Inc.) served as the frame of the dynamic windows. Conductive nylon tape (ElectricMosaic, Z22) enabled electrical contact to the perimeter of the ITO electrode.

In-situ optical measurements (transmittance and reflectance) were measured with an Ocean Optics FX spectrometer coupled with an Ocean Optics halogen light source (HL-2000-FHSA) and a reflectance probe. Applicant did not have the capability to perform in-situ transmittance measurements of 1 $ft^2$ devices but were able to perform the optical measurements on 6-inch dynamic windows with the electrode contact at one edge to simulate the behavior of a 1 $ft^2$ window. Complete optical data used for the performance modeling was collected from 300-2500 nm with 2 nm increments using a Cary 5000 UV-VIS-NIR spectrometer coupled with a Universal Measurement Accessory (Cary, UMA). SEM was performed with either a FEI NovaLab 600i scanning electron microscope operated at an accelerating voltage of 5 kV or an FEI Magellan 400 XHR scanning electron microscope operated at an accelerating voltage of 5 kV. Surface topology was measured with a NanoSurf easyScan 2 atomic force microscope.

Optical performance modeling was conducted using Window 7.7 (LBNL) and Optics 6 (LBNL) software. Glazing data for the View, Inc. and SageGlass windows was obtained from the International Glazing Database (IGDB v29.0). Specifically, the Optics 6 software was used to analyze and convert the raw spectrophotometry measurements for the metal-based dynamic windows, and the WINDOW 7 software was used to model the IGU with the various glazing layers and degrees of tint. The WINDOW 7 software includes algorithms for calculating VLT and SHGC that are consistent with the standards set by ASHRAE SPC 142, IS015099, and the National Fenestration Rating Council (NFRC). The dimensions of the IGU were selected to model a typical unit and the thickness and orientation of each layer is shown schematically in FIG. 30. The dynamic glass layer is 5 mm thick and faces outside of the building and the clear glass layer is 6 mm thick and serves as the inward-facing portion of the IGU. There is a 12.7 mm gas layer consisting of 90% argon/10% air in between the glass layers. The NSG Pilkington Optifloat™ Clear glass product was selected as the clear glass layer because it has high visible and solar transmittance and neutral color.

Results

FIGS. 1E-1H present SEM and AFM measurements for metals deposited at −0.8 V vs. Ag/AgCl for one minute on platinized ITO (Pt-ITO) electrodes with and without a 0.1 wt. % addition of PVA (Mw: 61,000) to the electrolyte. The control film grown without any additives (i.e. 0% PVA) is rough (RMS: 46.2 nm) and was comprised of metal pillars with a wide size distribution and low surface coverage (see FIGS. 1E-1F). This film morphology is typical of metal growth in a dilute concentration case. The plating solution with 0.1 wt. % addition of PVA, in contrast, deposits a smooth (RMS: 4.05 nm), uniform morphology (see FIGS. 1G-1H). The metal film is compact and comprised of generally spherical particles with a relatively narrow size distribution.

Figure 5:
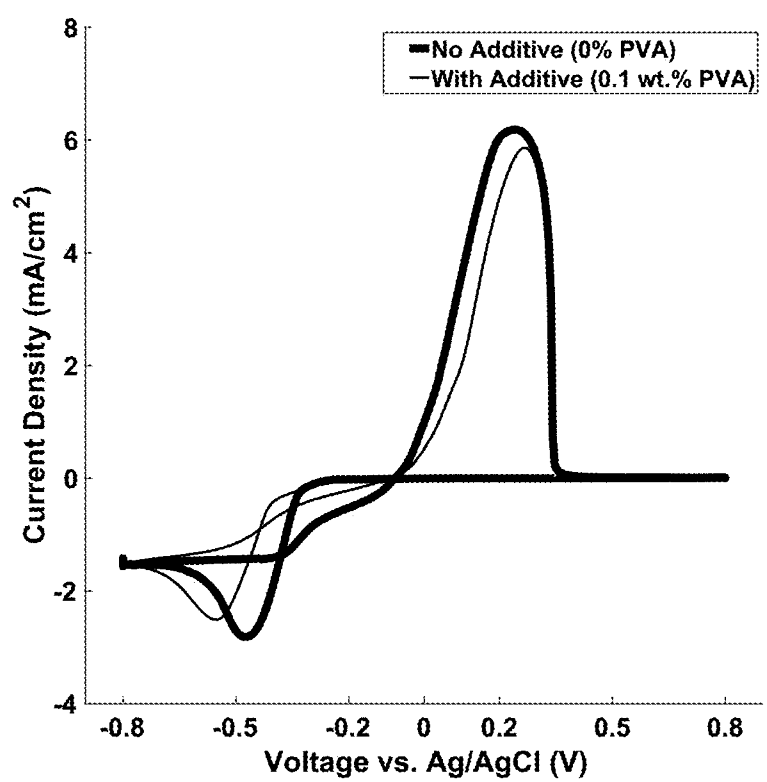
FIG. 5: cyclic voltammogram of Bi—Cu electrolyte without polymer and with addition of 0.1 wt. % PVA measured in a 3-electrode cell with a Pt-ITO working electrode, Pt wire counter electrode and Ag/AgCl reference electrode at a scan rate of 20 mV/s. The shift in deposition overpotential and decrease in current density indicate an inhibitor effect.

The efficacy of inhibitors in plating solutions is often characterized electrochemically. It is common to observe electrode polarization and decreased current density (i.e. plating rate) when a polymeric layer forms on the electrode surface. This effect is readily observed by performing cyclic voltammetry (CV) experiments in a three-electrode cell and relating the current-voltage relationship between a control solution and a solution with the polymer additive. FIG. 5 shows CV data for the control electrolyte and the electrolyte with 0.1 wt. % PVA. The solution with PVA exhibits an increase in the deposition overpotential (80 mV shift) and lower current density as a function of voltage compared to the control solution. Both the shift in overpotential and reduced current density are indicative of the inhibitor effect in the electroplating solution. The polymer layer polarizes the electrode and introduces an additional energy barrier to nucleation (i.e. increase in overpotential). The deposition rate is reduced because the metal ions must diffuse through the charged polymer layer and compete with the polymer for adsorption sites on the electrode surface.

Figure 6B:
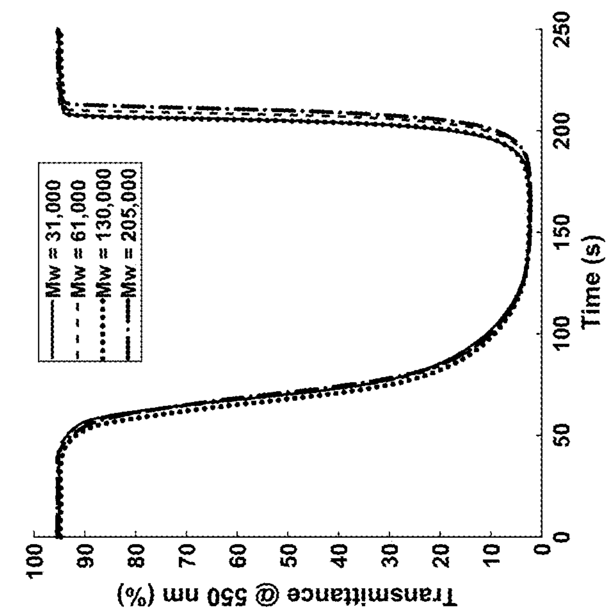
FIG. 6B: the corresponding transmittance curves at 550 nm measured in-situ during the CV scan. The CV was measured in a 3-electrode cell with a Pt-ITO working electrode, Pt wire counter electrode and Ag/AgCl reference electrode at a scan rate of 20 mV/s.
Figure 6A:
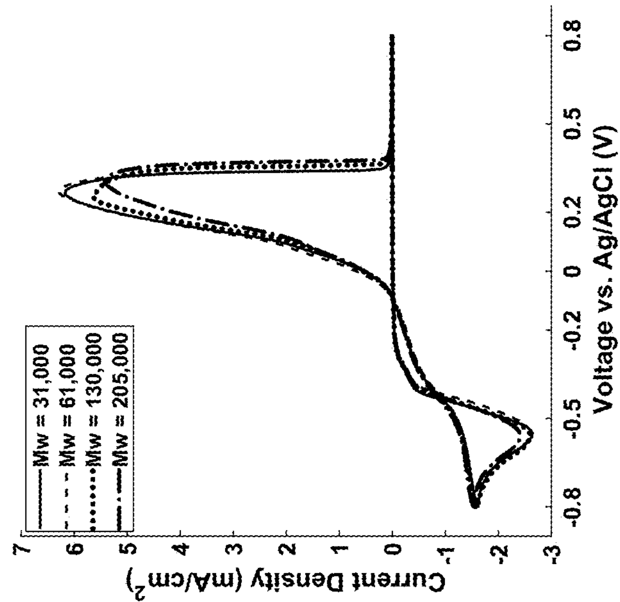
FIG. 6A: cyclic voltammogram (CV) of Bi—Cu $ClO_4$ electrolyte with 0.1 wt. % PVA of four different molecular weights.
Figure 7:
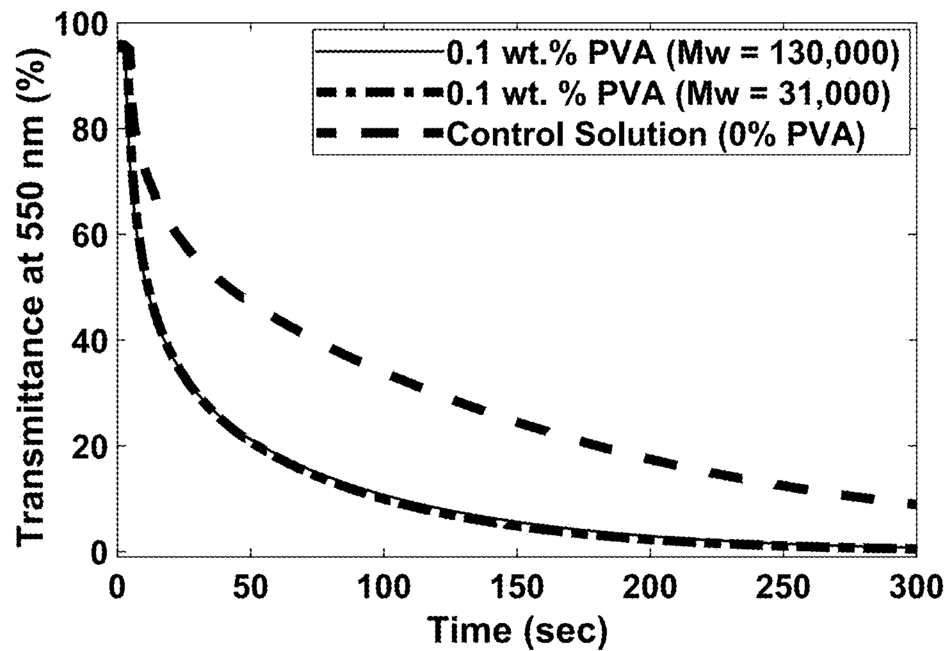
FIG. 7: transmittance (at 550 nm) versus time during constant-voltage deposition at −0.8 V versus Ag/AgCl on a Pt-ITO electrode for Bi—Cu electrolytes with two different PVA molecular weights at a fixed concentration. The experiment was performed in a 3-electrode spectroelectrochemical cell and transmittance was measured in-situ.
Figure 8:
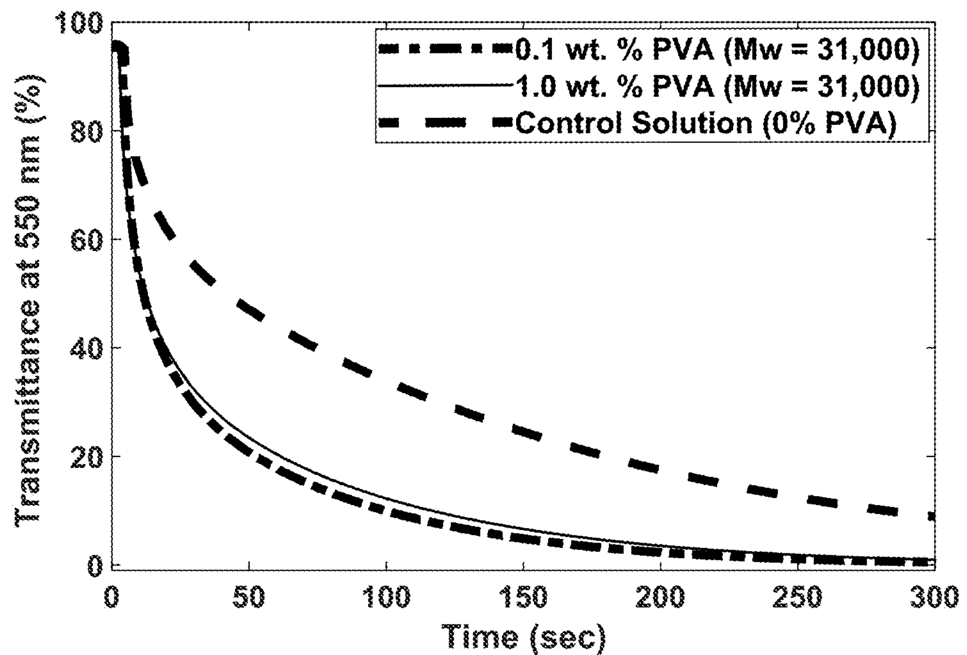
FIG. 8: transmittance (at 550 nm) versus time during constant-voltage deposition at −0.8 V versus Ag/AgCl on a Pt-ITO electrode for Bi—Cu electrolytes with two different PVA concentrations at a fixed molecular weight. The experiment was performed in a 3-electrode spectroelectrochemical cell and transmittance was measured in-situ.
Figure 9:
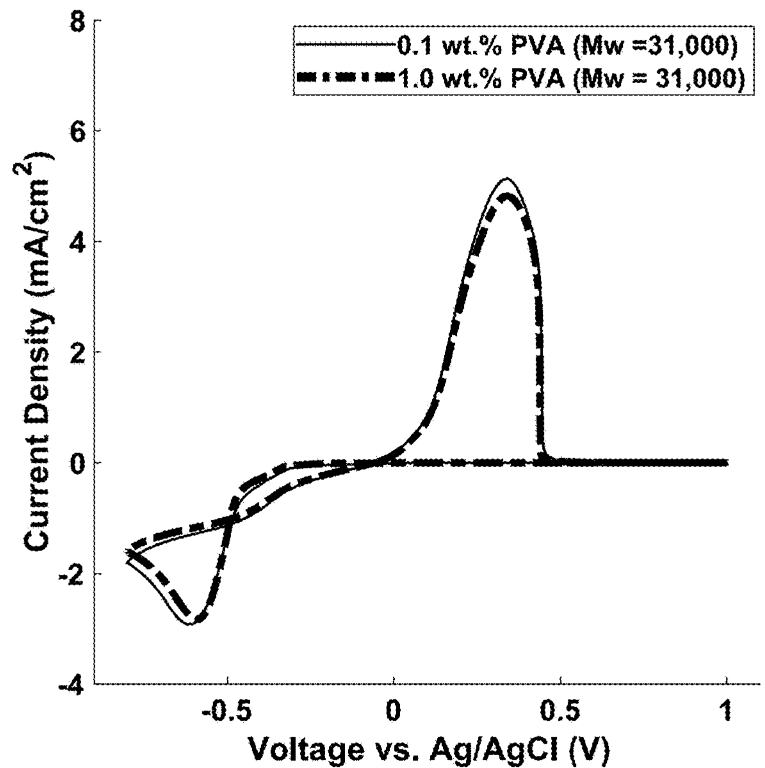
FIG. 9: cyclic voltammogram of Bi—Cu $ClO_4$ electrolyte with two different concentrations of PVA at a fixed molecular weight. The CV was performed in a 3-electrode setup with a Pt-ITO working electrode, a Pt wire counter electrode, and a Ag/AgCl reference electrode at a scan rate of 20 mV/s.

Molecular weight and concentration of the polymer can be important variables that can affect the thickness and density of the polymer coating as well as the viscosity of the solution. To illustrate such, spectroelectrochemical data for electrolytes with variable molecular weight and concentration of PVA were gathered to understand the significance of these variables in the present systems. No clear dependence of the electrochemical response or optical change was observed in the molecular weight range of 31,000 to 205,000 g/mole (see FIGS. 6A-7). It was also observed that the concentration of polymer in the electrolyte does not affect the electrochemical kinetics or film optics (see FIG. 8-9). The absence of trends for molecular weight and polymer concentration is in agreement with the proposed adsorption-based inhibition mechanism. For PVA, there is one hydroxyl group (i.e. adsorption site) per monomer unit and the molecular weight determines the number of repeat units per polymer chain. At a fixed weight percentage, the total number of monomer units (with one hydroxyl group per unit) in solution is the same regardless of the molecular weight. In the adsorption mechanism, the inhibitor works as long as there is sufficient concentration of polymer to form a complete monolayer and thus the molecular weight of the polymers is not a significant factor as long as this criterion is met. That said, as described herein, molecular weight can affect the viscosity and dissolution characteristics, and so may be selected based on such desired criteria.

This same understanding explains the insensitivity to polymer concentration provided the concentrations studied exceed the critical limit for surface coverage. Through a simple calculation, one can compare the quantity of hydroxyl groups in solution at some known polymer concentration to the number of adsorption sites on the electrode surface. For 0.1 wt. % polymer concentration, the number of hydroxyl groups in solution exceeds the number of adsorption sites by about five orders of magnitude. It is clear that the concentration of polymer in the tested electrolyte far exceeds the requirement for forming a complete monolayer on the electrode surface.

The detailed calculation is presented below.

Adsorption Sites Calculation

Molecular weight of monomer unit of PVA:

$$M = 44.07\ \text{g/mol}$$

Concentration of PVA in Electrolyte $$C = 0.1\ \text{wt. }\% = 1\ \text{g/L}$$

(assuming density of water)

Number Concentration of Hydroxyl Groups in Electrolyte $$\left(\frac{1\ \text{mol}}{44.07\ \text{g}}\right)\left(\frac{1\ \text{g}}{\text{L}}\right) * N_A \sim 10^{22}\ \text{L}^{-1}$$

Projected 2D Area of Water Molecule $$\pi r^2 = \pi(1.375\ \text{nm})^2 \approx 6\ \text{nm}^2\left(\frac{1\ \text{cm}^2}{10^{14}\ \text{nm}^2}\right) = 6 * 10^{-14}\ \text{cm}^2$$

Number of Water Molecule "Sites" Per Cm$^2$ of Electrode Area $$\left(\frac{1}{6 * 10^{-14}\ \text{cm}^2}\right) \approx 1.7 * 10^{13}\ \text{cm}^{-2}$$

(simplifying adsorption sites to squares instead of circles)

Volume of Electrolyte Per Cm$^2$ of Device Area $$(1\ \text{cm})(1\ \text{cm})(0.5\ \text{cm}) = 0.5\ \text{cm}^3$$

(assuming electrolyte layer is 5 mm thick)

Compare Volumetric Concentration of Sites in Solution (Hydroxyl Groups) and Areal Concentration of Sites on the Electrode Surface (Adsorption Sites)

Hydroxyl Sites in Solution Per $Cm^2$ of Device Area $$(10^{22}\text{ sites }L^{-1})\left(\frac{1\text{ L}}{1000\text{ cm}^3}\right)(0.5\text{ cm}^3) = 5*10^{18}\text{ sites}$$

Adsorption Sites on Surface Per Cm2 of Device Area $$1.7*10^{13}\text{ cm}^{-2}\sim 10^{13}\text{ sites}$$

$$5*10^{18}\text{ sites} >> 10^{13}\text{ sites}$$

We chose to add 0.1 wt. % PVA (Mw: 61,000) to the electrolyte for subsequent experiments because it was the lowest concentration that could be reproducibly added to small-volume batches of solution. Further, the polymer molecular weight did affect the process time for preparing solutions (higher molecular weight PVA took longer to dissolve in the electrolyte) so it was advantageous to work with the lower molecular weight polymers. At commercial scale, the relative tolerance of the inhibitor to concentration and molecular weight may ease manufacturability because variance in the polydispersity and weight percentage of the polymer additive should have little to no effect on the window performance.

We did not restrict our study to PVA and experimented with other water-soluble polymers like polyethylene glycol (PEG), polyvinyl pyrrolidone (PVP), and hydroxyethyl cellulose (HEC). Of the polymers tested, however, PVA was the most viable candidate, as it did not produce solubility issues in the perchlorate-based electrolyte used in this work. While the experiments conducted may primarily focus on PVA-electrolytes as the model case, it is important to note that there are numerous polymers and small molecules that can exhibit morphology control for reversible metal electrodeposition, that could alternatively or additionally be used.

Exploring Other Polymers

In addition to PVA, we experimented with other water-soluble polymers like polyethylene glycol (PEG), polyvinyl pyrrolidone (PVP), and hydroxyethyl cellulose (HEC). PEG is a polyol that is similar to PVA but contains oxygen atoms in the polymer backbone instead of the side group. PVP is not a polyol and has an amide unit in the side group, as do many other electroplating additives. HEC is a cellulose derivative used as a thickening agent in aqueous products like shampoo. The molecular structure of each polymer is shown below.

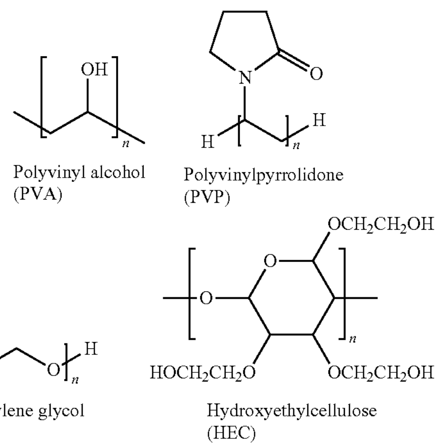

Of the polymers tested, PVA is the only candidate that did not produce solubility issues in the perchlorate-based electrolyte used in this work. This electrolyte is optimized for long-term durability but exhibits higher sensitivity to additives. We did not, however, observe any solubility issues with these additives in the halide-based electrolyte used in our previous work, which permitted further study of the different polymers. The Bi—Cu halide-based electrolyte was as described in the Methods section above.

Figure 17:
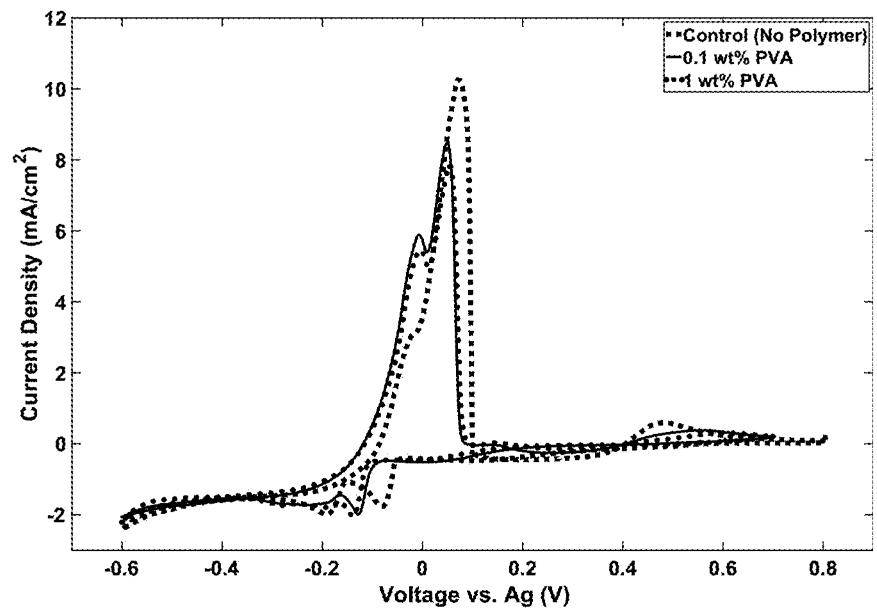
FIG. 17: cyclic voltammogram of Bi—Cu halide electrolyte with two different concentrations of PVA. The CV was performed in a 3-electrode setup with a Pt wire working electrode, a Pt wire counter electrode, and a Ag wire pseudo-reference electrode at a scan rate of 20 mV/s.
Figure 18:
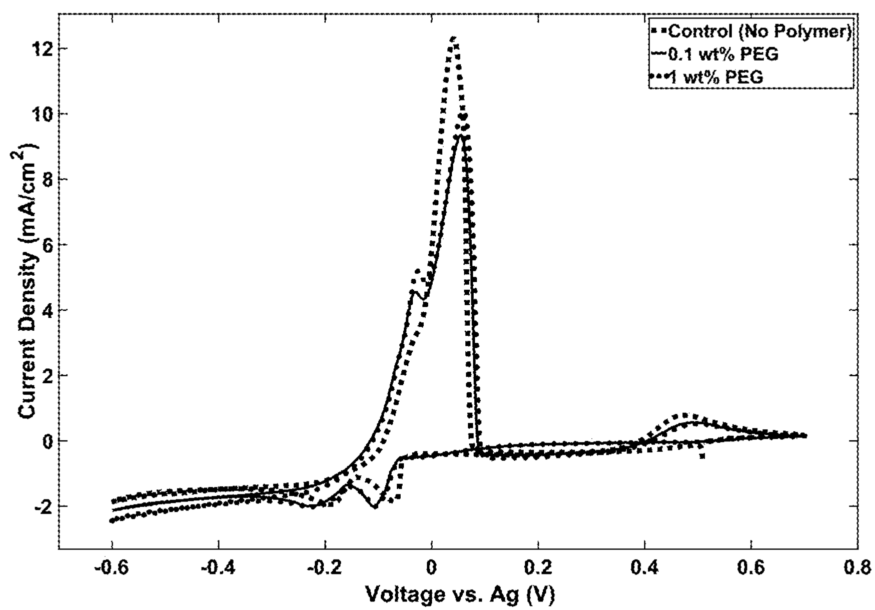
FIG. 18: cyclic voltammogram of Bi—Cu halide electrolyte with two different concentrations of PEG. The CV was performed in a 3-electrode setup with a Pt wire working electrode, a Pt wire counter electrode, and a Ag wire pseudo-reference electrode at a scan rate of 20 mV/s.
Figure 19:
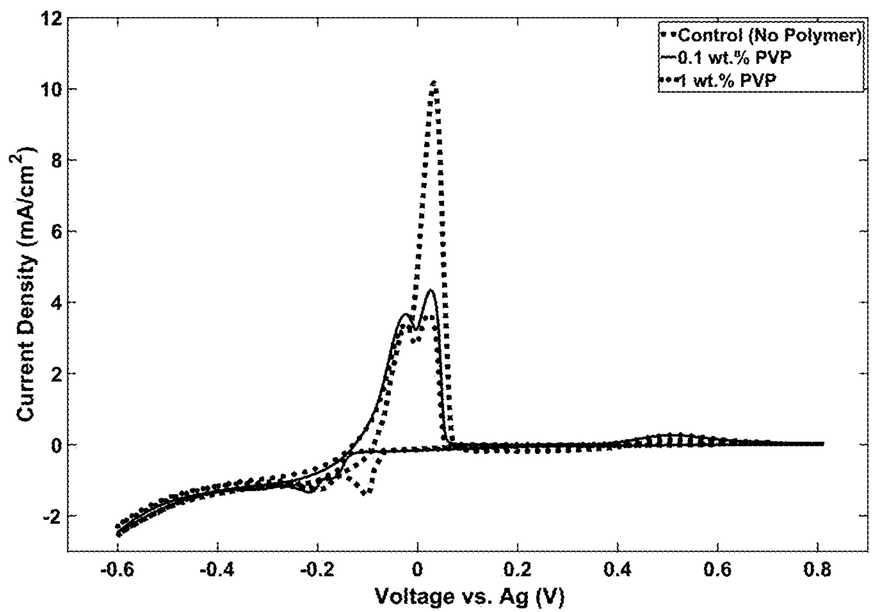
FIG. 19: cyclic voltammogram of Bi—Cu halide electrolyte with two different concentrations of PVP. The CV was performed in a 3-electrode setup with a Pt wire working electrode, a Pt wire counter electrode, and a Ag wire pseudo-reference electrode at a scan rate of 20 mV/s.
Figure 20:
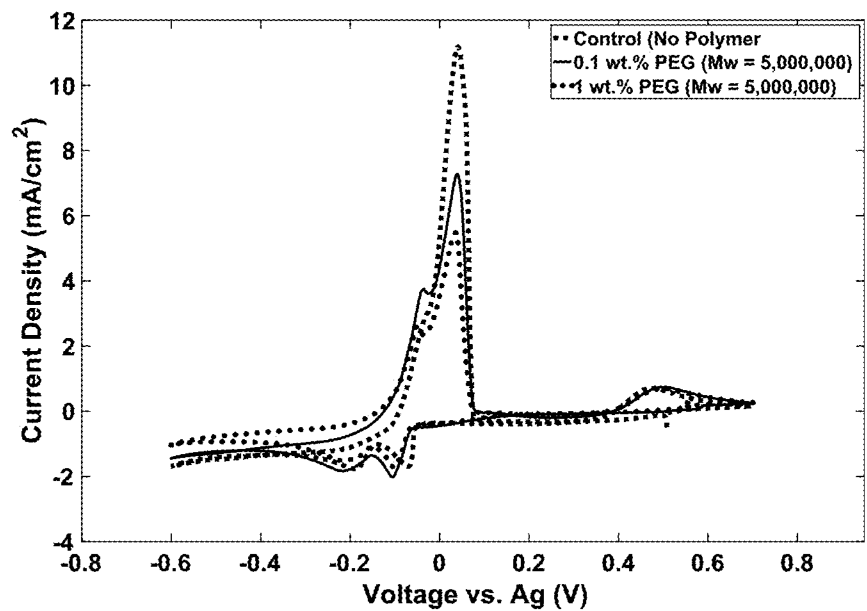
FIG. 20: cyclic voltammogram of Bi—Cu halide electrolyte with two different concentrations of PEG with ultrahigh molecular weight (Mw=5,000,000). The CV was performed in a 3-electrode setup with a Pt wire working electrode, a Pt wire counter electrode, and a Ag wire pseudo-reference electrode at a scan rate of 20 mV/s. Current density decrease with concentration is attributed to an increase in solution viscosity.
Figure 21:
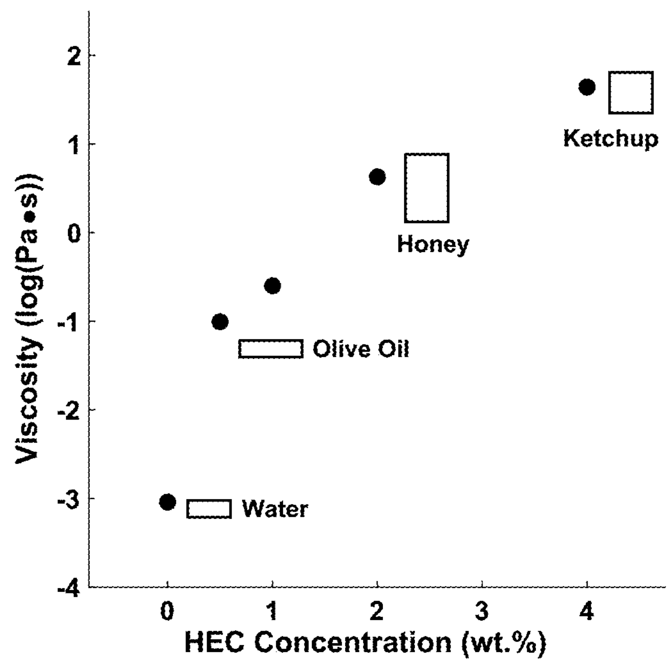
FIG. 21: viscosity of Bi—Cu halide electrolyte with varying concentration of hydroxyethyl cellulose (HEC) compared to common liquids.
Figure 22:
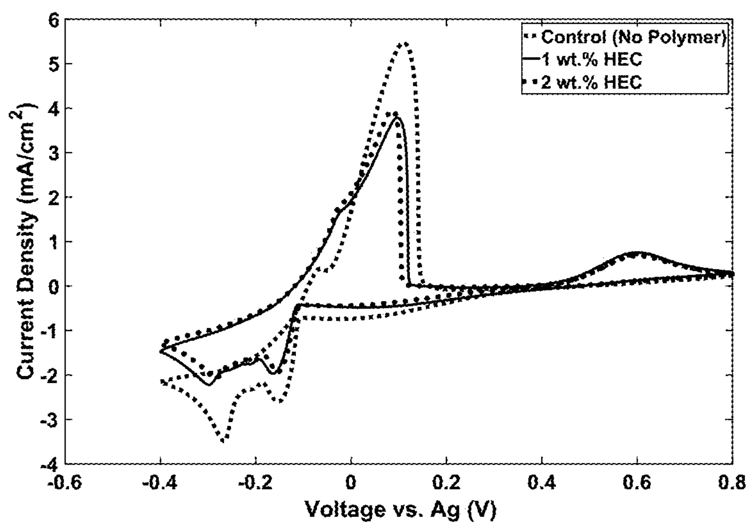
FIG. 22: cyclic voltammogram of Bi—Cu halide electrolyte with two different concentrations of hydroxyethyl cellulose (HEC). The CV was performed in a 3-electrode setup with a Pt-ITO working electrode, a Pt wire counter electrode, and a Ag wire pseudo-reference electrode at a scan rate of 20 mV/s. Current density decrease with concentration is attributed to an increase in solution viscosity.
Figure 23A:
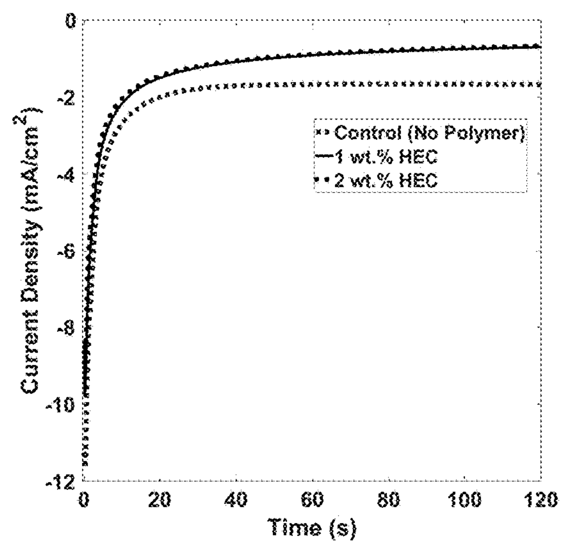
FIG. 23A: chronoamperometry at −0.4 V in Bi—Cu electrolyte with two concentrations of HEC using a Pt-ITO working electrode and a Ag reference electrode.
Figure 23B:
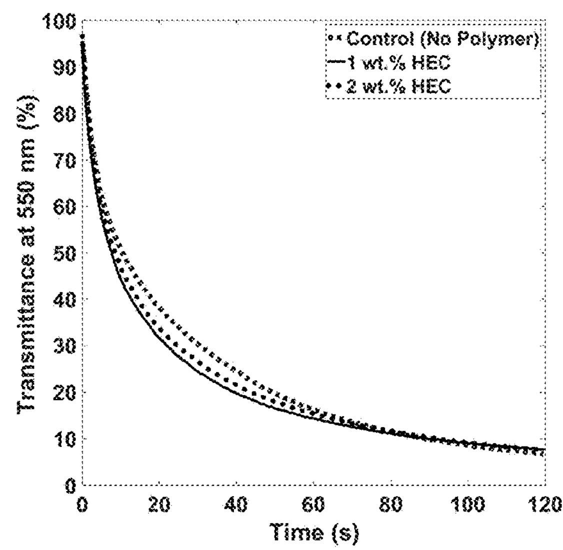
FIG. 23B: transmittance (at 550 nm) versus time measured in-situ during the chronoamperometry experiments in FIG. 23A.
Figure 24A:
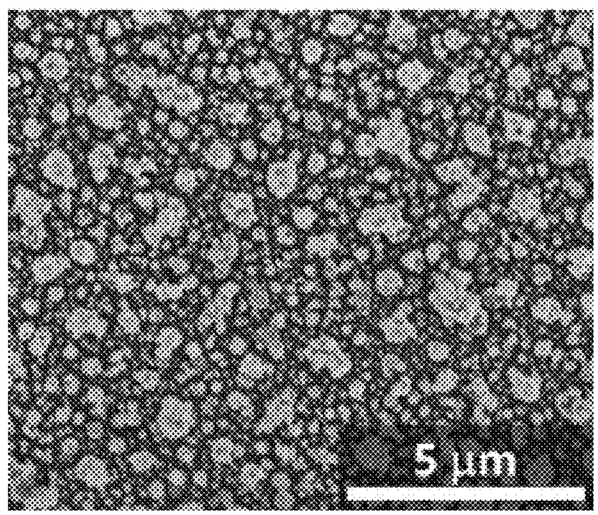
FIGS. 24A-24B show SEM images of metal electrodeposits plated on a Pt-ITO electrode from a Bi—Cu halide electrolyte.
Figure 24B:
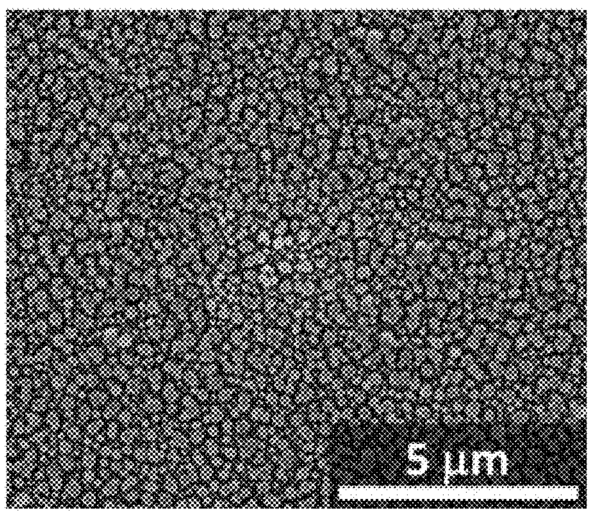
Figure 25:
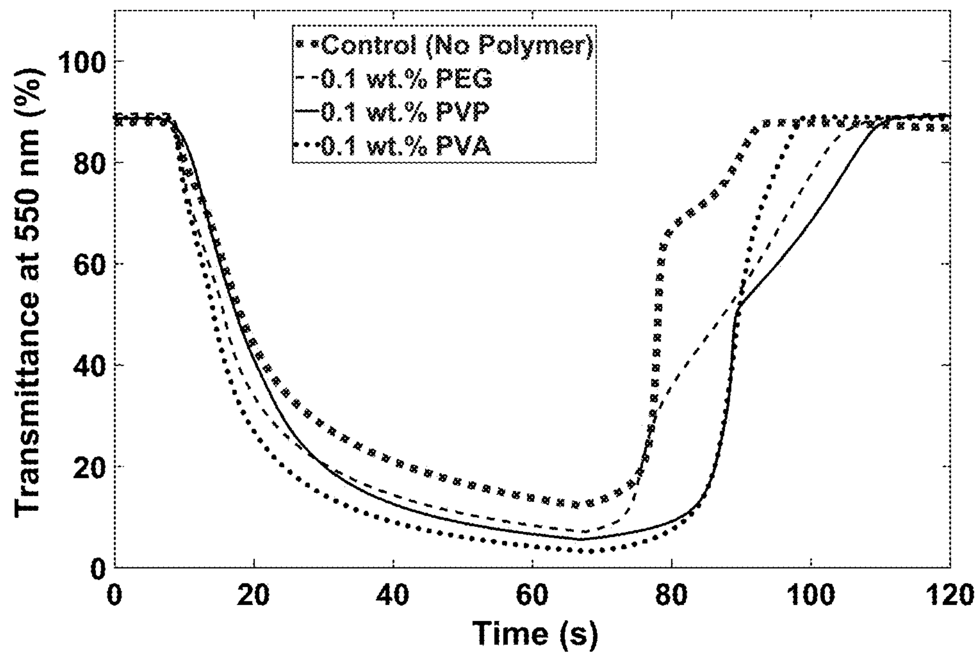
FIG. 25: transmittance (at 550 nm) versus time of dynamic windows containing Bi—Cu halide electrolyte with different polymer additives. A distinct dynamic window was fabricated and measured for each electrolyte composition. Transmittance is plotted for one switching cycle consisting of plating at −0.8 V for 60 seconds followed by stripping at +0.8 V. The dynamic window architecture is shown in FIG. 1A.
Figure 26:
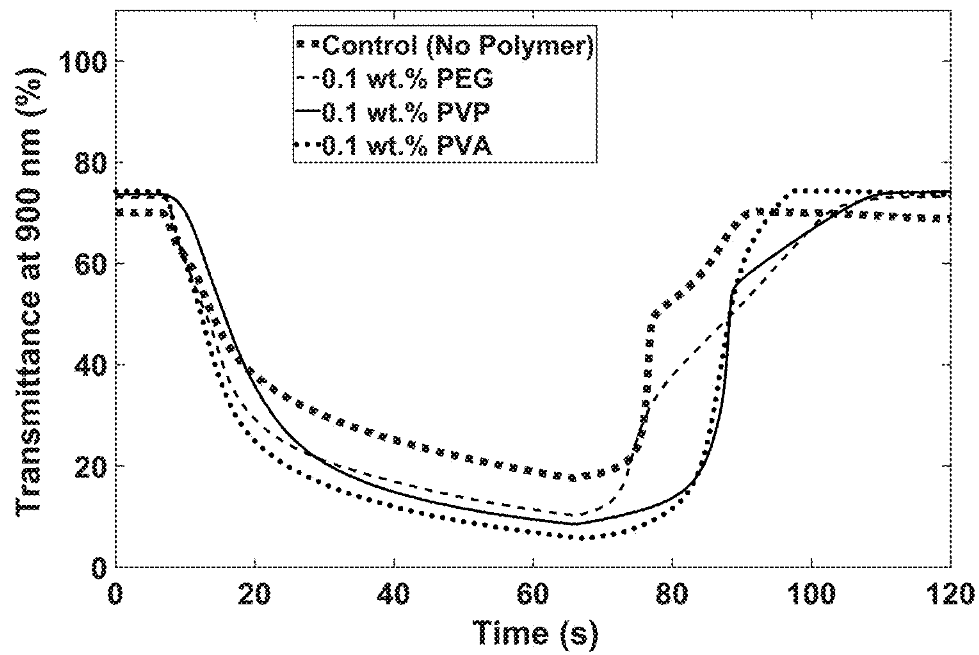
FIG. 26: transmittance (at 900 nm) versus time of dynamic windows containing Bi—Cu halide electrolyte with different polymer additives. A distinct dynamic window was fabricated and measured for each electrolyte composition. Transmittance is plotted for one switching cycle consisting of plating at −0.8 V for 60 seconds followed by stripping at +0.8 V.
Figure 27:
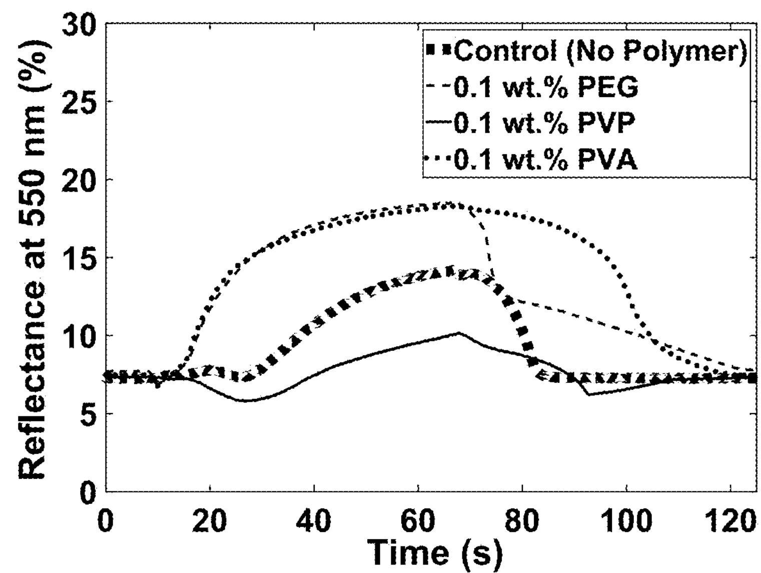
FIG. 27: reflectance (at 550 nm) versus time of dynamic windows containing Bi—Cu halide electrolyte with different polymer additives. A distinct dynamic window was fabricated and measured for each electrolyte composition. Reflectance is plotted for one switching cycle consisting of plating at −0.8 V for 60 seconds followed by stripping at +0.8 V.
Figure 28:
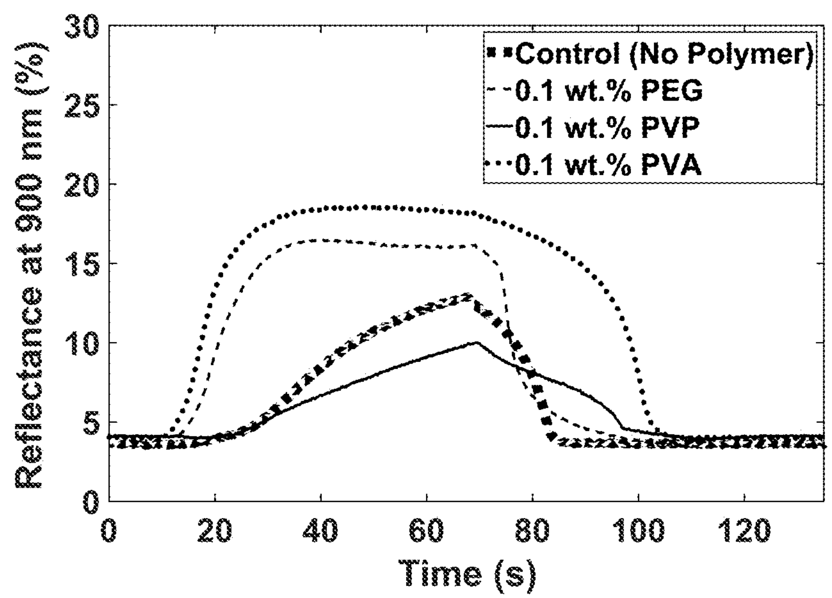
FIG. 28: reflectance (at 900 nm) versus time of dynamic windows containing Bi—Cu halide electrolyte with different polymer additives. A distinct dynamic window was fabricated and measured for each electrolyte composition. Reflectance is plotted for one switching cycle consisting of plating at −0.8 V for 60 seconds followed by stripping at +0.8 V.

PVA, PEG, and PVP exhibited an inhibitor effect in the Bi—Cu halide system. Cyclic voltammograms (CVs) measured in the Bi—Cu halide electrolyte for each polymer are shown in FIGS. 17-19. For each of the three polymers we observed the above referenced increase in overpotential and decrease in current density. Similar to the PVA results discussed, no trend was observed for changes in concentration. Similarly, no trend was observed for changes in molecular weight for the polymers tested in FIGS. 17-19. However, when testing a PEG additive with ultrahigh molecular weight (Mw=5,000,000) a trend for concentration was observed, wherein higher polymer concentration led to decreased current density (see FIG. 20). Such is believed to be due to increased solution viscosity. A similar observation was made with the HEC additive. FIG. 21 plots solution viscosity for varying concentrations of HEC. FIG. 22 shows a similar decrease in current density with increasing polymer concentration measured with CV. HEC did not cause an increase in deposition overpotential, but did yield increased switching speed at short times (see FIGS. 23A-23B). SEM shows that the HEC promoted a denser film morphology (which explains the initial switching speed increase seen in FIG. 24A-24B), but the metal film remains discontinuous and thus has the same transmittance as the control at longer deposition times (see FIG. 25). Thus, increased viscosity from HEC plays a role in how the metal films form even if the polymer is not strongly adsorbed to the surface. It is, however, a weaker effect as compared to the results with the PVA inhibitor. Returning to the PVA example, after confirming that PVA promoted a measurable effect on the metal film morphology, we probed the optical response that arises from the structure of the different films.

Superior Optical Performance

Metal films comprised of particles often appear quite different from their bulk, mirror-like counterparts. When familiar reflectors like gold and silver are broken down into nanoparticles and embedded into glass, the brilliant colors of stained glass emerge and bear no indication of their metallic origin. The shape, size, and environment of metal particles on the nanoscale serve as the design parameters for creating metal films with the desired macroscale effect. For dynamic windows, the reflective properties of metals are attractive for controlling solar heat gain, but too much reflection can have aesthetic, and even legal, consequences. According to one embodiment, the right balance is a 'black mirror' appearance that absorbs a significant fraction of visible light and reflects most of the infrared spectrum (i.e. heat) when the window is tinted.

To measure the optical properties of the different metal morphologies, 5 cm×5 cm dynamic windows were fabricated with and without the polymer inhibitor in solution, and in-situ transmittance measurements were performed during three minutes of tinting (i.e. metal deposition) at a potential of −0.8 V. The transmittance spectra at four different time points are plotted for the control device (without additives) in FIG. 2A and for the dynamic window with 0.1 wt. % PVA in the electrolyte in FIG. 2B. A schematic view of the dynamic window architecture is presented in FIG. 1A and photographs of the devices are included in the provisional application. The transmittance at 550 nm (where the human eye is most sensitive) versus switching time is plotted for both devices in FIG. 2C. By comparing the optical response of the control device (without additives) and the dynamic window that contains 0.1 wt. % addition of PVA in the electrolyte, it is clear that the polymer inhibitor elicits improved switching speed, color neutrality (i.e. substantially flat response across the visible spectrum), and contrast (down to 0.001% transmittance for privacy).

The polymer inhibitor also makes the dynamic windows more efficient. Coloration efficiency is an important metric for assessing dynamic windows that use electrochemical reactions and is defined as the change in optical density over a fixed area per unit charge. Dynamic windows with higher coloration efficiency require less energy to switch and yield less voltage drop across practical-scale electrodes. FIG. 2D plots charge density versus time and shows that the rate of charge consumption is lower for the dynamic window with the PVA inhibitor. The combination of the lower rate of charge consumption and the increased switching speed (see FIGS. 2C-2D) gives the dynamic window with the polymer inhibitor a coloration efficiency that is 2-3× higher than the control device depending on the desired contrast (see FIG. 2E).

Figure 10B:
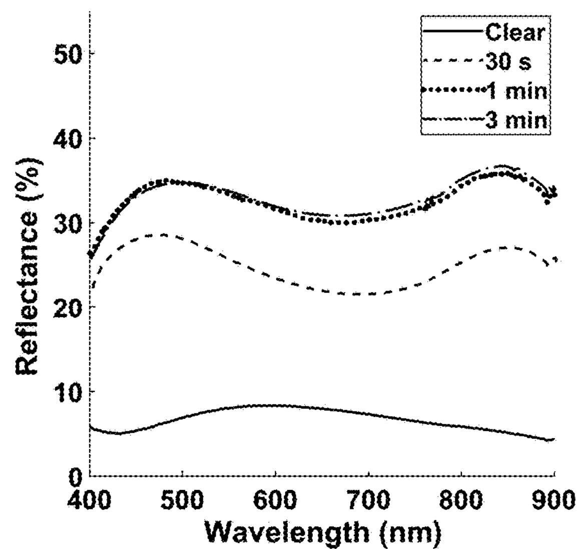

The improvement in optical performance and efficiency is attributed to the metal film morphology that forms in the presence of the PVA additive. Without any additives in solution, the metal film is discontinuous and light can transmit through the pores or gaps between metal deposits. The 'spiky' particles also increase scattering (and thus absorption) events and yield a film that is absorptive, and thus poor at rejecting heat (see FIG. 10A). The polymer inhibitor slows down the plating rate and supports deposition of smooth, uniform metal deposits. The resulting metal films are dense and efficient at blocking light and yield windows that reflect, rather than absorb, heat (see FIG. 10B). The use of polymer inhibitors for controlling the electrodeposit morphology is important for striking the right balance between power consumption and optical modulation in dynamic windows.

The optical performance of dynamic windows with a PVA additive in the electrolyte was investigated by measuring the transmittance (T) and reflectance (R) in the $300<\lambda<2500$ nm wavelength range corresponding to solar radiation over the series of optical states accessible to the technology. T(λ) and R(λ) are plotted in FIGS. 3A-3C for seven distinct optical states of dynamic windows with the PVA inhibitor additive. The shape of the transmittance spectrum in the clear state is determined by the transmittance through the ITO and aqueous electrolyte along with the two outer layers of glass. This shape is maintained as the window tints because the electroplated metal film blocks light uniformly across the solar spectrum. An important advantage of metal-based dynamic windows over competing technologies is an exclusive "full blackout privacy state" with, e.g., 0.001% visible transmittance that functions like blackout curtains for providing quality sleep (see FIG. 3A). Such a privacy state is made possible by the dense metal morphology facilitated by the PVA or other additive. The reflectance spectrum in the clear state is primarily dictated by the ITO that serves as a low-emissivity coating that transmits visible light and reflects infrared wavelengths ($\lambda>700$ nm, or >1200 nm, such as 700 nm to 2500 nm, or 700 nm to 1200 nm). The reflectance increases across the solar spectrum as the window tints because the metal film becomes more reflective as it grows. The high infrared reflectance ($700<\lambda<2500$ nm) of up to 70% in some embodiments is important for energy control as about half of solar energy is in this regime. Additionally, the reflectance properties of the dynamic windows can differ with the viewing direction (see FIG. 3B vs. FIG. 3C). The reflectance spectra in FIG. 3B were measured through the side of the device with the ITO electrode, and the spectra in FIG. 3C were measured through the side of the device with the metal counter electrode (see FIG. 1A for a schematic view of the device layers). The surface where the metal nucleates (i.e. the ITO electrode) is more reflective while the top surface of the metal (shown in FIGS. 1G-1H) is more absorptive and has a matte appearance. Further, light that reflects off the top surface of the metal must travel back through the electrolyte where it can be scattered or absorbed. Thus, in an embodiment the reflective surface can be oriented towards the exterior of the building where it can efficiently reject light and heat. The absorptive side exhibiting a "matte" appearance can face inward where a mirror-like appearance may be aesthetically undesirable to the people indoors.

As already noted, the principal optical metrics for windows are visible light transmittance (VLT) and solar heat gain coefficient (SHGC). The visible light transmittance is the fraction of light in the visible spectrum ($\sim400<\lambda<\sim700$ nm) that passes through the window. A high VLT provides daylighting that can offset electric lighting, but also causes glare under direct sun. The solar heat gain coefficient is the percentage of solar radiation that enters a building through the window. This includes incident radiation that is directly transmitted through the window and absorbed radiation that is subsequently re-radiated into the building. A high SHGC is desirable in cold climates to offset heating loads, and a low SHGC is important in hot climates to manage cooling loads. Static windows use a spectrally-selective stack of metal films and anti-reflection layers with specific thicknesses that transmits visible light and reflects the infrared. The problem with static windows, however, is that the outdoor environment is in flux. For example, a static window configured to reflect infrared wavelengths may be desirable in the summer months or in a hot climate, but the opposite would be desirable in the winter months or in a cold climate.

Dynamic windows that access a range of VLT|SHGC combinations introduce a new paradigm. With dynamic windows, users can adjust the optical properties according to the local climate without sacrificing the primary function of their window: the view. In the present dynamic windows, with a modest voltage, the thickness of the metallic layer is adjusted to strike the right balance of daylighting and solar gain throughout each day. The best static windows use metal films to find this balance. The advance of dynamic metal films with tunable thickness could propel a new generation of windows that adapt to the user's preferences and environment.

To compare the optical performance of RME windows to other dynamic window technologies, a double-pane insulating glass unit (IGU) was modeled and the performance metrics were calculated. A description and justification of the modelling parameters and calculations is provided in the "IGU Modeling" section below.

IGU Modeling

Definitions:

Visible Light Transmittance (VLT): the fraction of visible light (380 nm to 720 nm), weighted by sensitivity of the human eye, that transmits through the window. It is a dimensionless value from 0 to 1.

$$VLT = \int_{380\ nm}^{720\ nm} T(\lambda)E(\lambda)$$

Here T(λ) is the spectral transmittance at a given wavelength in nanometers and E(λ) is the incident solar spectral irradiance. When integrated over the visible portion of the electromagnetic spectrum, the equation yields the total fraction of transmitted visible light.

Solar Heat Gain Coefficient (SHGC): the fraction of incident solar radiation admitted through a window, both directly transmitted and absorbed and subsequently release inward. SHGC is calculated from 300 nm to 2500 nm (i.e. solar spectrum). It is a dimensionless value from 0 to 1.

$$SHGC = \int_{300\ nm}^{2500\ nm} T(\lambda)E(\lambda)$$

Here T(λ) is the spectral transmittance at a given wavelength in nanometers and E(λ) is the incident solar spectral irradiance. When integrated over the solar radiation spectrum, the equation yields the total fraction of transmitted solar energy.

Color (Chroma and L*a*b*)

The universal system for quantifying color is the CIE L*a*b* color space that is designed to model human color perception with three coordinates. L* is a luminance coordinate from dark (black) to light (white), a* is a coordinate between red and green, and b* is a coordinate between yellow and blue. Each (L*,a*,b*) point specifies a color and the axes are linear with respect to the sensitivity of the human eye. Assessing color neutrality is simplified by introducing a fourth coordinate called the "chroma" (C*) where:

$$C^* = \sqrt{a^{*2} + b^{*2}}$$

When C*<10, the human eye has difficulty distinguishing the color of the object and it is perceived as gray (neutral).

Modeling Methodology

To model the dynamic window technologies as a full insulating glass unit (IGU), the Windows and Daylighting software suite was used, which is available through the Lawrence Berkeley National Laboratory (LBNL). The Optics 6 software was used to analyze and convert the raw spectrophotometry measurements for the metal-based dynamic windows, and the WINDOW 7 software was used to model the IGU with the various glazing layers and degrees of tint. The WINDOW 7 software includes algorithms for calculating VLT and SHGC that are consistent with the standards set by ASHRAE SPC 142, ISO15099, and the National Fenestration Rating Council (NFRC).

Figure 30:
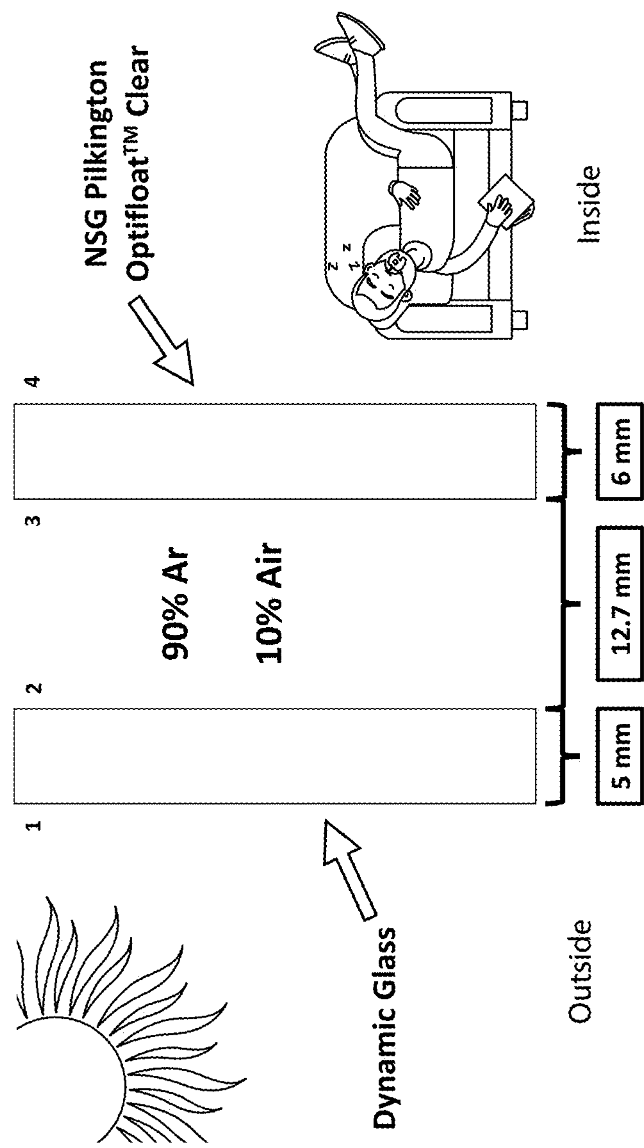
FIG. 30: schematic view of modeled insulating glass unit (IGU). Dynamic glass layer is 5 mm thick and oriented to face the outside of the building. The clear glass layer (NSG Pilkington Optifloat™ Clear) is 6 mm thick and oriented to face the inside of the building. The 12.7-mm-thick gas layer consisting of 90% Ar/10% air is sandwiched between the glass layers to form the complete double-pane unit. Surfaces 1-4 are labeled according to convention.

The dimensions of the IGU were selected to model a typical unit and the thickness and orientation of each layer is shown schematically in FIG. 30. The dynamic glass layer is 5 mm thick and faces outside of the building and the clear glass layer is 6 mm thick and serves as the inward-facing portion of the IGU. There is a 12.7 mm gas layer consisting of 90% Argon/10% Air in between the glass layers. The emissivity of the glass on surfaces 1, 3, and 4 is assumed to be 0.84 and the emissivity of the low-emissivity coating on surface 2 is assumed to be 0.15. The NSG Pilkington Optifloat™ Clear glass product was selected as the clear glass layer because it has high visible and solar transmittance and neutral color. This enables a fair comparison between the different electrochromic technologies.

The optical data for the metal-based dynamic windows was obtained by measuring the transmittance and reflectance (through both orientations) from 300 nm to 2500 nm for seven distinct optical states. This data is presented in FIGS. 3A-3C. The data was formatted according to the International Glazing Database (IGDB) standard and imported into the glazing database in the WINDOW 7 software program.

The optical data for the View, Inc. and SageGlass products were publicly available in IGDB v29.0 and imported into the WINDOW 7 software program. Each technology had optical data available for four different tint states that was used for further calculations.

The visible light transmittance, the solar heat gain coefficient, and the color coordinates (L*a*b*) for each optical state of each technology were calculated. There were seven optical states for the metal-based dynamic windows, four states for the SageGlass windows, and four states for the View, Inc. windows. All of the calculated data is presented below in Table 1.

TABLE 1

| Product - Tint State | VLT | SHGC | L* | a* | b* | Chroma* |
|---|---|---|---|---|---|---|
| SageGlass - Clear | 0.622 | 0.473 | 83.43 | −4.69 | 15.3 | 16.00 |
| SageGlass - 20% T | 0.210 | 0.167 | 53.18 | −12.2 | −0.49 | 12.21 |
| SageGlass - 6% T | 0.059 | 0.107 | 29.66 | −10.4 | −7.52 | 12.83 |
| SageGlass - 1% T | 0.016 | 0.089 | 13.49 | −6.49 | −7.81 | 10.15 |
| View, Inc. - Tint 1 | 0.561 | 0.465 | 79.22 | −3.66 | 19.52 | 19.86 |

TABLE 1-continued

| Product - Tint State | VLT | SHGC | L* | a* | b* | Chroma* |
|---|---|---|---|---|---|---|
| View, Inc. - Tint 2 | 0.397 | 0.295 | 68.87 | −5.01 | 16.57 | 17.31 |
| View, Inc. - Tint 3 | 0.201 | 0.165 | 51.69 | −6.39 | 9.56 | 11.50 |
| View, Inc. - Tint 4 | 0.030 | 0.094 | 20.31 | −8.40 | −4.16 | 9.37 |
| Metal - Clear | 0.760 | 0.603 | 89.93 | −2.81 | −1.02 | 2.99 |
| Metal - Tint 1 (5 s) | 0.605 | 0.526 | 82.1 | −2.64 | 1.42 | 3.00 |
| Metal - Tint 2 (15 s) | 0.385 | 0.341 | 68.34 | −1.76 | 2.57 | 3.11 |
| Metal - Tint 3 (30 s) | 0.282 | 0.267 | 60.02 | −0.98 | 2.96 | 3.12 |
| Metal - Tint 4 (60 s) | 0.145 | 0.160 | 44.84 | −0.33 | 3.7 | 3.71 |
| Metal - Tint 5 (120 s) | 0.079 | 0.108 | 33.68 | 0.08 | 4.32 | 4.32 |
| Metal - Privacy (180 s) | 0.00001 | 0.045 | 0.03 | 0.01 | 0.00 | 0.01 |

The calculated values of visible light transmittance (VLT), solar heat gain coefficient (SHGC), color coordinates (L*a*b*), and chroma shown in Table 1 were calculated using the WINDOW 7 software (for the Sage and View products), and calculated by modeling the IGU shown schematically in FIG. 30 for those of the present disclosure (Metal).

Figure 11:
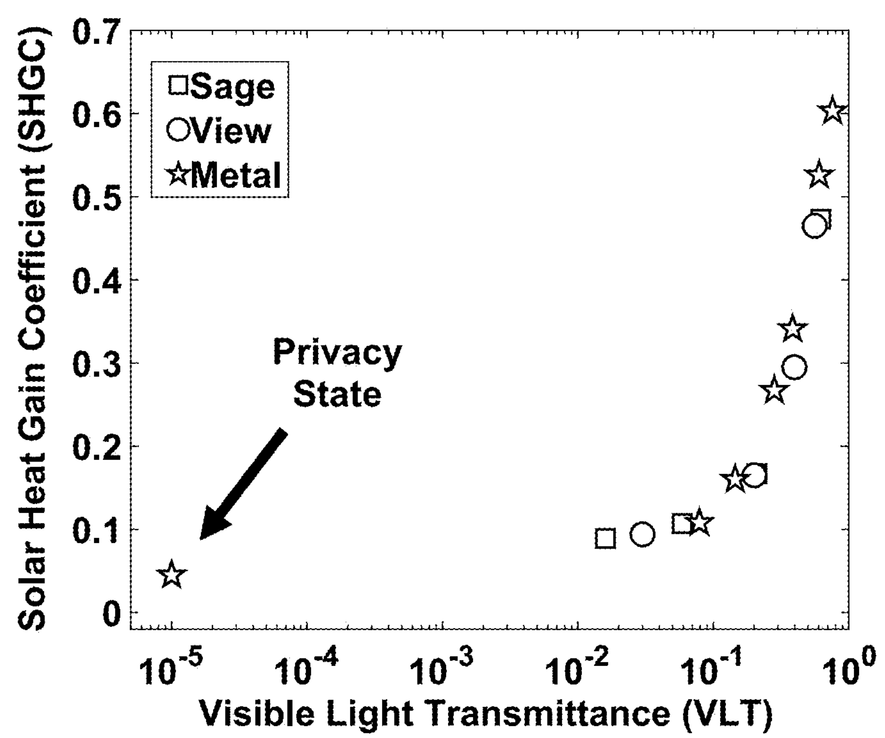
FIG. 11: solar heat gain coefficient (SHGC) versus visible light transmittance (VLT) for the optical range of metal-based dynamic windows compared to industry leaders Sage Glass (Sage) and View, Inc. (View). The VLT data is plotted on a logarithmic scale to distinguish the privacy state that is unique to the present metal-based windows.
Figures 12A, 12B, 12C:
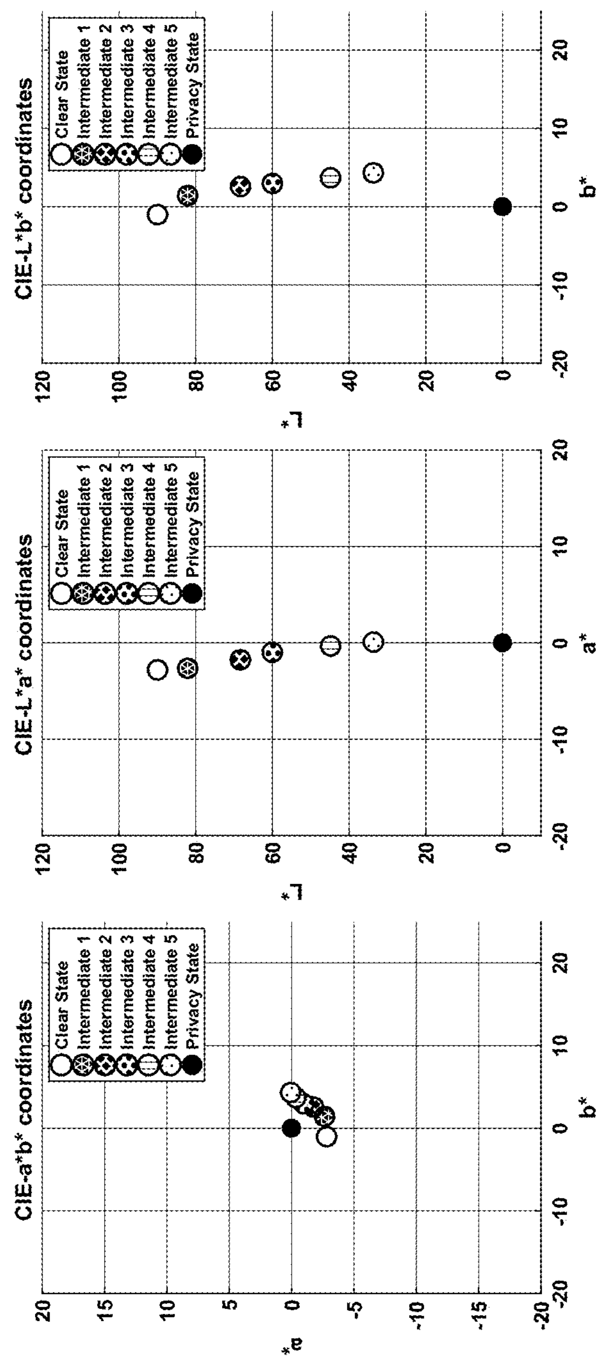
FIGS. 12A-12C: 2-dimensional projections of L*a*b* coordinates for seven distinct optical states of dynamic windows based on reversible metal electrodeposition. The metal-based dynamic windows exhibit true clear-to-gray-to-black color transition across the optical range.
Figures 13A, 13B, 13C:
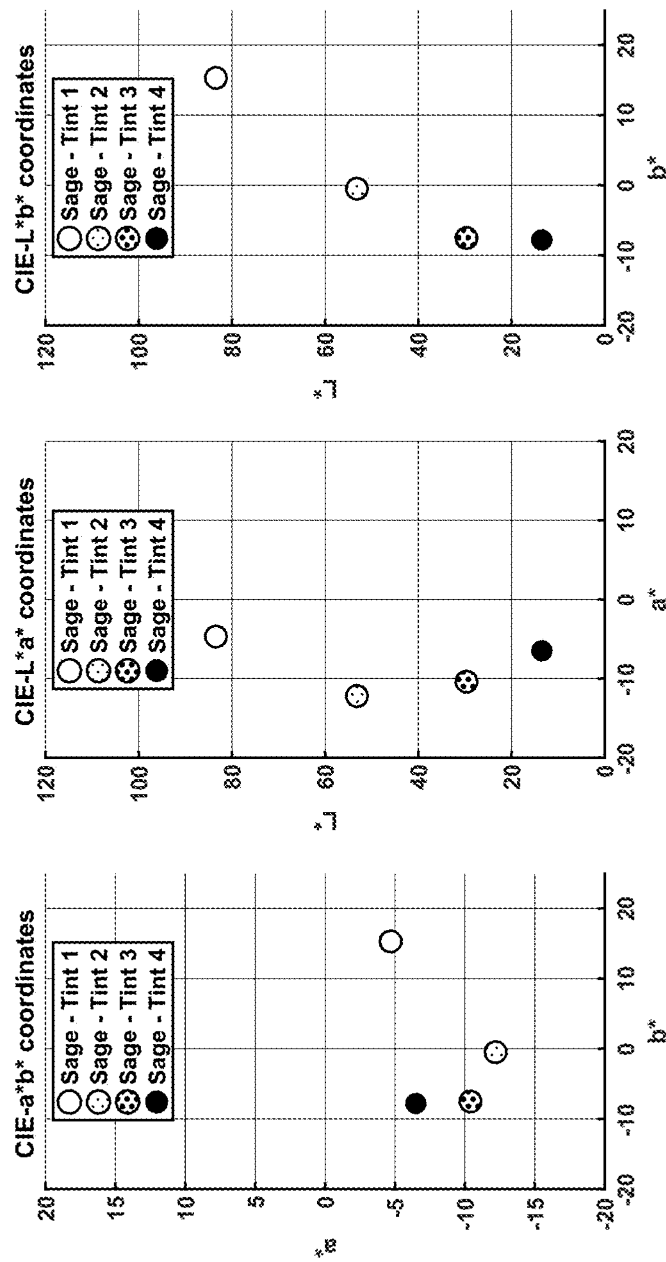
FIGS. 13A-13C: 2-dimensional projections of L*a*b* coordinates for four optical states of Sage Glass dynamic windows (from IGDB v29.0).
Figures 14A, 14B, 14C:
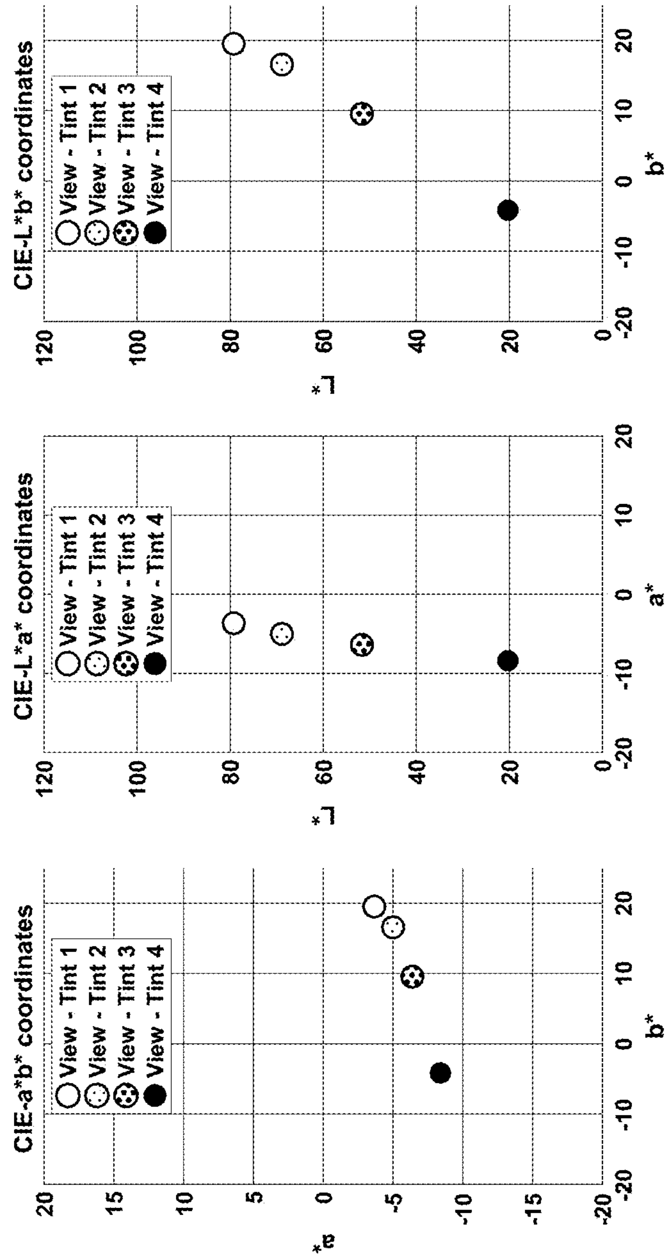
FIGS. 14A-14C: 2-dimensional projections of L*a*b* coordinates for four optical states of Sage Glass dynamic windows (from IGDB v29.0).

FIG. 3D presents the VLT|SHGC space for the present metal-based dynamic windows ("Metal") and two commercially available dynamic window products from industry leaders View, Inc. and SageGlass. FIG. 11 plots the VLT data from FIG. 3D on a logarithmic scale to emphasize the privacy state that is unique to the present windows that use metal electrodeposition. The "Metal" IGU boasts the largest dynamic range of the technologies with $\Delta T_{vis}$=0.76 and ΔSHGC=0.56. The metal-based dynamic windows achieve a higher $\Delta T_{vis}$ than the competing technologies because the design does not require relatively thick (>1 μm) oxide electrodes that absorb visible light. The dynamic windows achieve a superior ΔSHGC because of the high clear-state transmittance and reflective (versus absorptive) properties of the metal film (see FIGS. 3B-3C).

As noted above, the color of windows is an equally important consideration. Most people prefer a neutral color transition (clear-to-gray-to-black) that does not distort the appearance of their indoor environment. Indeed, color is often cited as one of the largest drawbacks of existing technology that often appears yellow when clear and turns blue as it tints. As noted, where Chroma (C*) is <10 (or absolute value of a* and/or b* is <5), the human eye has difficulty distinguishing the color of the object and it is perceived as gray (neutral). FIG. 3D, plots the C* vs. VLT for the three evaluated window technologies. The dynamic windows that use metal as the active layer exhibit neutral color over their entire optical range. FIGS. 12A-14C, plot projections of the L*a*b* coordinates for the optical states of each technology, illustrating the undesirable yellow and blue color tints of the competing technologies, as compared to the desired gray of the present disclosure.

1 Ft$^2$ Dynamic Windows

A major challenge for deploying electrochromic technologies at scale is minimizing voltage drop across the transparent electrode and achieving uniform tinting across the window. All materials (sans superconductors) possess internal resistance to current flow that scales with the distance the charge must traverse. For windows, this problem is exacerbated by the requirement for transparent conductors that are generally 100× more resistive than common conductors like copper. Applicant developed an analytical model of electrode resistance for electrochromic windows and derived a simple equation for the voltage drop across a square electrode, as shown in equation 1 below. The voltage drop often yields non-uniform tinting.

$$\Delta V = \frac{JR_{sh}L^2}{8}; \quad \text{(eq. 1)}$$

$J$ = current density, $R_{sh}$ = sheet resistance, $L$ = electrode length

There are several strategies for achieving uniform tinting over large-area (>1 m$^2$) windows. The most common approach is to slow down the switching speed and thus lower the current density required for the window to tint. As a result, the majority of commercial electrochromic windows take ~20 minutes to transition across their optical range. Kinestral Technologies has pioneered the use of patterned electrodes that enable their HALIO® product to tint "10× faster" than incumbent technologies, but this perk comes at a cost premium. A final strategy to achieve fast and uniform tinting is to decrease the sheet resistance of the electrodes. However, none of the efforts to reduce the electrode resistance have been successful at a large scale.

Dynamic windows based on reversible metal electrodeposition (RME) enable a unique strategy for reducing the resistance of the electrodes. Metals are excellent conductors and deposition of continuous metal films decreases the resistance of the electrodes as the metal film grows thicker. This approach was not possible in previous generations of RME windows, because the metal electrodeposits were isolated and discontinuous (see FIGS. 1E-1F). With the inclusion of an additive as described herein (e.g., a PVA inhibitor), the metal film has an uninterrupted morphology as shown in FIGS. 1G-1H that yields increased electrode conductivity as the window tints.

Figure 4A:
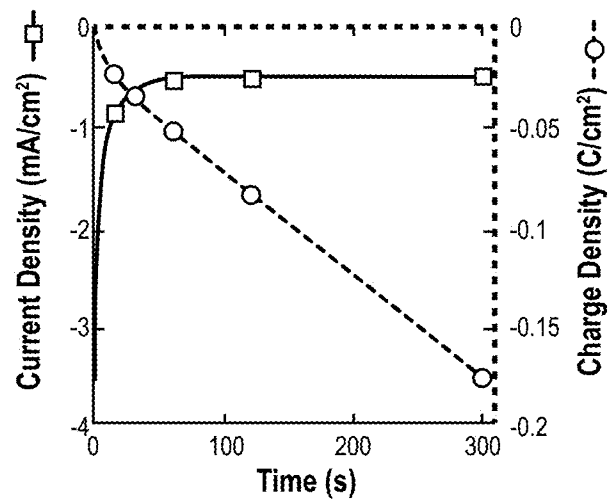
FIG. 4A: current density and charge density versus time for 300 seconds of electrodeposition.
Figure 4B:
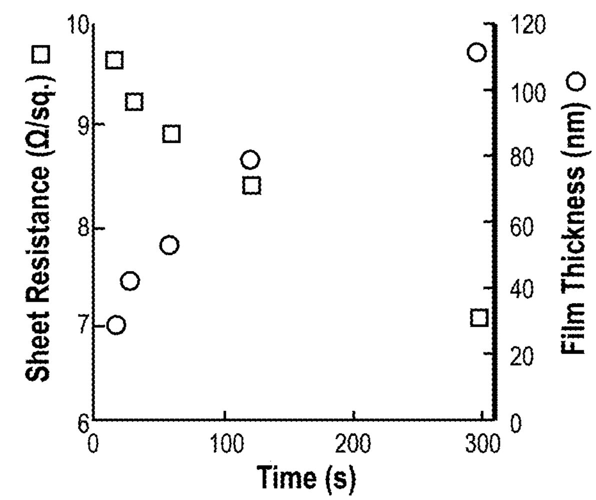
FIG. 4B: sheet resistance and film thickness versus time for samples measured at five distinct deposition times (15 s, 30 s, 60 s, 120 s, and 300 s).
Figure 4C:
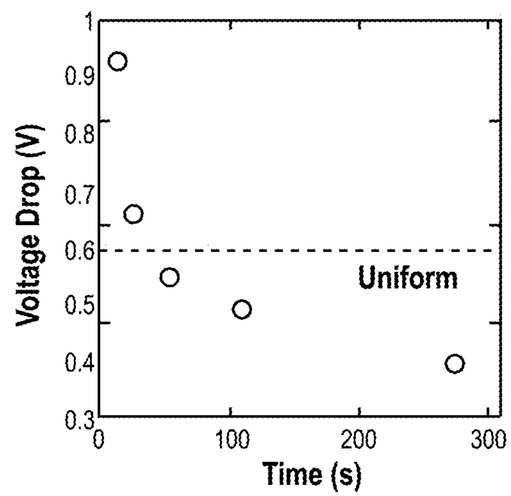
FIG. 4C: voltage drop from edge to center of a 1 $ft^2$ ITO electrode as a function of deposition time.
Figure 4E:
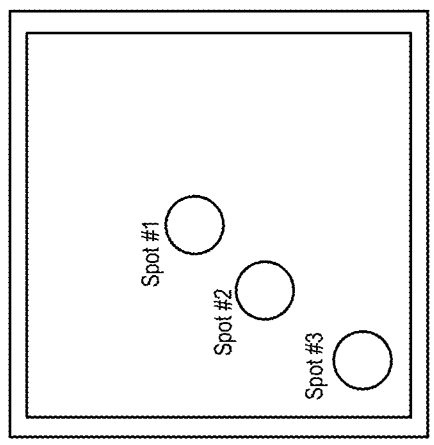
FIG. 4E: 1 $ft^2$ dynamic window in clear state with uniformity measurement locations indicated.
Figure 4D:
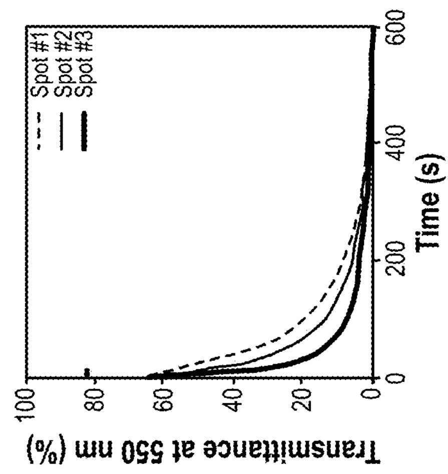
FIG. 4D: transmittance at 550 nm versus time measured at three different spots of a 1 $ft^2$ dynamic window to demonstrate uniform tinting from edge to center.
Figure 15:
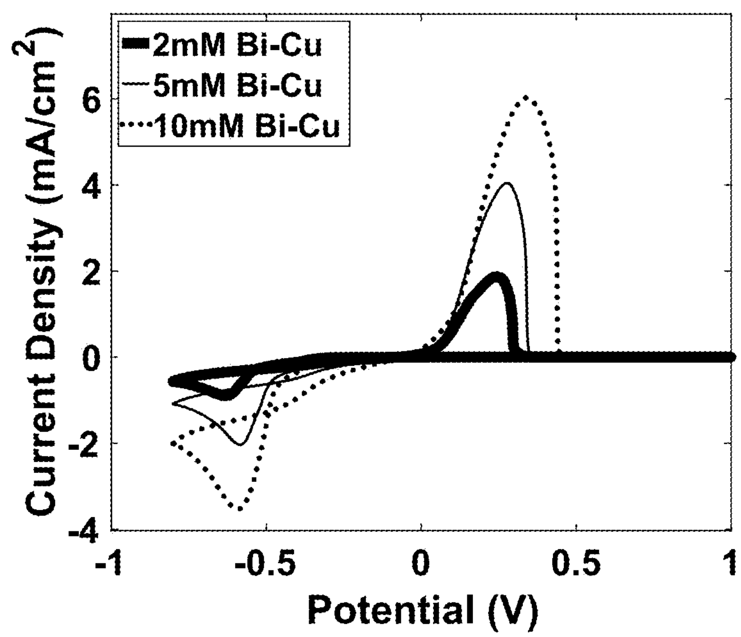
FIG. 15: cyclic voltammograms of Bi—Cu perchlorate electrolyte with three different concentrations of Bi and Cu ions. The current density decreases with the metal ion concentration. The CV was performed in a 3-electrode setup with a Pt-ITO working electrode, a Pt wire counter electrode, and a Ag/AgCl reference electrode at a scan rate of 20 mV/s.
Figure 16:
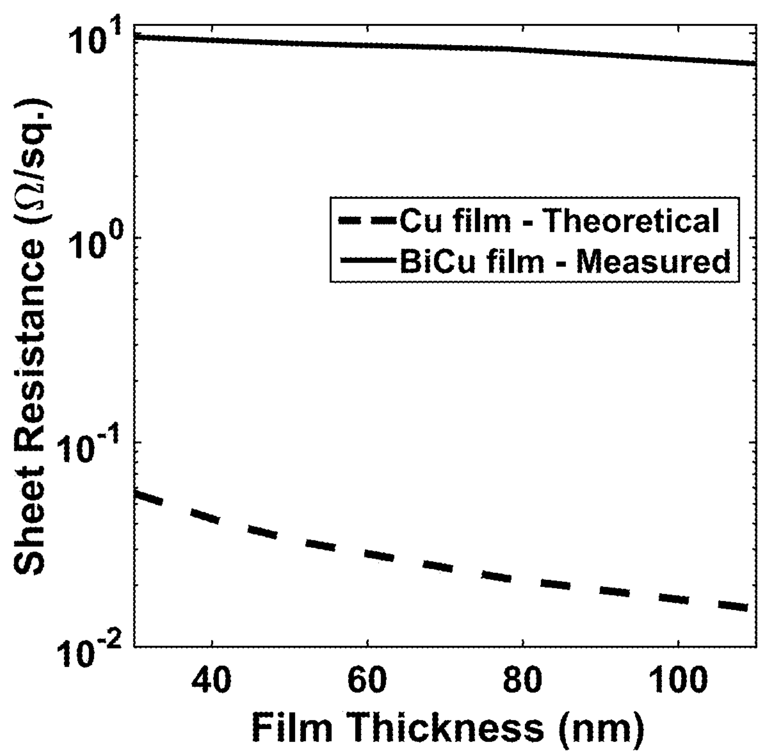
FIG. 16: sheet resistance versus film thickness of theoretical Cu film assuming ideal resistivity of $1.68\times10^{-8}$ ohm-m and the measured sheet resistance versus film thickness of the BiCu film electroplated on Pt-ITO with the perchlorate and PVA electrolyte as described herein (see FIG. 4B). This figure illustrates the potential to reduce the sheet resistance of the electrode as the window tints.

FIGS. 4A-4D characterize the electrical properties of the metal film as it grows on the Pt-ITO transparent electrode. FIG. 4A plots the current density and charge density versus time for 300 seconds of electrodeposition at −0.8 V and FIG. 4B shows the decrease in electrode sheet resistance as the metal film grows thicker over time. The corresponding voltage drop across a 1 ft$^2$ ITO electrode was calculated using Eq. 1 and plotted in FIG. 4C using the current density (J) in FIG. 4A and the sheet resistance ($R_{sh}$) in FIG. 4B across five different deposition times (15 s, 30 s, 60 s, 120 s, and 300 s). Electrodeposition rate is voltage-independent over some voltage range dependent on the electrolyte chemistry because the metal growth is diffusion-limited. The voltage tolerance (i.e. the voltage range where the electroplating rate is uniform) is 0.6 V for the electrolyte used in these working examples. The condition for uniform tinting in this system is highlighted in FIG. 4C with a dashed line. The decrease in voltage drop over time plotted in FIG. 4C indicates that uniform tinting is possible in a 1 $ft^2$ dynamic window after ~30 s of electrodeposition. To validate this hypothesis, a 1 $ft^2$ dynamic window was constructed and the transmittance (at 550 nm) versus time was measured at three different spots from the center of the window to the edge (see FIG. 4D). As expected, the window tinted faster at the edge (where the voltage is applied) for the first 30 seconds. However, with further electrodeposition, the optical modulation in the center caught up to the edge and the visible response of the entire window was substantially uniform. The optical response of the windows measured in FIGS. 4A-4D is slower than the dynamic windows measured in FIGS. 3A-3E because the active ion concentration was reduced from 10 mM to 5 mM to lower the current density (see FIG. 15). Diluting the ion concentration was not a viable option in previous working example iterations because the metal morphology became more porous upon dilution. The PVA inhibitor or other additive as described herein solves this problem by promoting a compact morphology, irrespective of ion concentration in the electrolyte.

The uniform deposition in a 1 $ft^2$ dynamic window is the culmination of three advantages of the PVA or similar additive: 2× improvement in coloration efficiency, 2× ion concentration dilution to halve the current density, and the 30% reduction in sheet resistance from the continuous metal film. The 2× improvement in coloration efficiency means that ½ the current is needed to switch the window at a fixed speed. By halving the metal ion concentration from 10 mM to 5 mM, the window operates at half the current density, and thus half the voltage drop across the electrode. The 30% reduction in sheet resistance lowers the voltage drop by an additional 30%. The combination of these three factors yields a tolerable voltage drop (<0.6 V) for uniform tinting in a 1 $ft^2$ dynamic window based on reversible metal electrodeposition. All these advantageous are facilitated, because of the inclusion of an electrolyte additive as described herein.

The maximum transmittance of the 1 $ft^2$ dynamic window is ~10% lower than the IGU modeled in FIGS. 3A-3E (65% versus 76%) because the large-scale prototype used a copper mesh counter electrode instead of a metal frame electrode shown in the device schematic in FIG. 1A, to maintain uniform ion diffusion across the electrolyte layer of the device. The copper mesh comprises 30-micron-wide wires spaced 224 microns apart in a square pattern and this mesh reflects a portion of the incident light. In previous working examples, the cycle life of devices was limited by the durability of the copper mesh counter electrode, which would fail (disintegrate) after about 300 cycles. The PVA inhibitor drastically improves the durability of the copper mesh by promoting uniform plating on the mesh and limiting the stripping reactions that dissolve the mesh. The mesh electrode in the device that contains 0.1% PVA showed no signs of degradation after 1000 cycles, while the mesh electrode in the device that included no additive as described herein showed noticeable severe disintegration of the mesh well before 1000 cycles. During such testing, each cycle comprised −0.8 V deposition for 1 minute followed by +1 V stripping for 1 minute. The transmittance of the dynamic windows in the clear state can be increased by using a mesh with thinner wires.

Although the working examples are principally described in the context of a PVA inhibitor as the electrolyte additive, it will be appreciated that a wide variety of other additives that can similarly improve the uniformity of the metal deposition morphology can additionally or alternatively be used, and are within the scope of the present disclosure.

Conclusion

While described principally in the context of windows, it will be appreciated that the present embodiments can be employed more broadly, e.g., in glass or plastic surfaces where dynamic tinting of the surface may be desired. Exemplary implementations include, but are not limited to windows, greenhouses, electric and other vehicles, transition sunglasses, goggles, tunable optics, clear-to-black monitors or other displays, adjustable shutters, IR modulators, thermal camouflage, and the like.

All publications, patents and patent applications cited herein, whether supra or infra, are hereby incorporated by reference in their entirety to the same extent as if each individual publication, patent or patent application was specifically and individually indicated to be incorporated by reference.

Unless otherwise stated, all percentages, ratios, parts, and amounts used and described herein are by weight.

Unless otherwise indicated, numbers expressing quantities, constituents, distances, or other measurements used in the specification and claims are to be understood as optionally being modified by the term "about" or its synonyms. When the terms "about," "approximately," "substantially," "generally" or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition.

Some ranges may be disclosed herein. Additional ranges may be defined between any values disclosed herein as being exemplary of a particular parameter. All such ranges are contemplated and within the scope of the present disclosure.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

In reference to various standardized tests (e.g., ISO15099 or other tests), it will be understood that reference to any such standard refers to the latest update (if any) of such standard, unless otherwise indicated. Any such referenced standards are incorporated herein by reference, in their entirety.

The present disclosure can be embodied in other specific forms without departing from its spirit or essential characteristics. Thus, the described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. An electrochromic dynamic window article capable of reversible metal electrodeposition, comprising:

a transparent or translucent conductive electrode;

an electrolyte in contact with the transparent or translucent conductive electrode, the electrolyte comprising metal cations that can be reversibly electrodeposited onto the transparent or translucent conductive electrode; and a counter electrode;

wherein the electrolyte comprises an additive configured to enhance a surface morphology of deposited metal cations during reversible metal electrodeposition, so as to enhance one or more of color neutrality, transmittance of visible wavelengths, infrared reflectance, or switching speed of the dynamic window;

wherein at least one of (i) or (ii):

(i) the additive reduces an RMS surface roughness of a reversibly deposited metal layer onto the transparent electrode to a value that is less than 30 nm;

(ii) the dynamic window is configured to achieve a high infrared reflectance of wavelengths in a range of 700 nm to 1200 nm that is at least 30%.

2. The article as recited in claim 1, wherein the electrolyte additive is a polymer.

3. The article as recited in claim 2, wherein the electrolyte polymer additive comprises at least one of a polyol, an amine-based polymer, or a cellulose derivative.

4. The article as recited in claim 3, wherein the electrolyte polymer additive comprises at least one of polyvinyl alcohol, polyvinyl pyrrolidone, or hydroxyethyl cellulose.

5. The article as recited in claim 1, wherein the electrolyte additive comprises a polyol.

6. The article as recited in claim 1, wherein the electrolyte additive comprises polyvinyl alcohol.

7. The article as recited in claim 1, wherein the electrolyte additive is present in the electrolyte in an amount of up to 10% by weight.

8. The article as recited in claim 1, wherein the electrolyte additive is present in the electrolyte in an amount from 0.01% to 1% by weight.

9. The article as recited in claim 1, wherein the electrolyte additive comprises an inhibitor as used in electroplating, an accelerator as used in electroplating, a leveler as used in electroplating, or an organic or inorganic molecule that similarly serves to enhance the surface morphology of a deposited film formed from the metal cations during reversible metal electrodeposition onto the transparent electrode.

10. The article as recited in claim 1, wherein the additive reduces an RMS surface roughness of a reversibly deposited metal layer onto the transparent electrode to a value that is less than 25 nm, less than 20 nm, less than 15 nm, less than 10 nm, or less than 5 nm.

11. The article as recited in claim 1, wherein the dynamic window is configured to achieve a near zero transmissivity to provide a privacy state, where transmission of visible light wavelengths after full tinting is 1% or less, 0.1% or less, 0.01% or less, or 0.001% or less.

12. The article as recited in claim 1, wherein the dynamic window is configured to achieve a high infrared reflectance of wavelengths in a range of 700 nm to 1200 nm that is at least 40%, at least 50%, at least 60%, or at least 70%.

13. The article as recited in claim 1, wherein the dynamic window is configured to achieve color neutral characteristics with a chroma (C*) of less than 10, less than 8, or less than 5, over an operative VLT range of the dynamic window.

14. The article as recited in claim 1, wherein the dynamic window is configured to achieve color neutral characteristics with |a*| or |b*| values of less than 5, over an operative VLT range of the dynamic window.

15. The article as recited in claim 1, wherein the metal cations comprise copper.

16. The article as recited in claim 1, wherein the electrolyte is an aqueous electrolyte solution.

17. The article as recited in claim 1, wherein the electrolyte further comprises an anion selected for its ability to achieve at least one of (i) maintain solubility of components in the electrolyte or (ii) minimize or prevent etching of the transparent or translucent conductive electrode.

18. The article as recited in claim 17, wherein the anion comprises perchlorate.

19. An electrochromic dynamic window article capable of reversible metal electrodeposition, comprising:

a transparent or translucent conductive electrode;

an electrolyte solution in contact with the transparent or translucent conductive electrode, the electrolyte solution comprising metal cations that can be reversibly electrodeposited onto the transparent or translucent conductive electrode upon application of a cathodic potential; and a counter electrode;

wherein the electrolyte solution further comprises an additive that is an inhibitor, an accelerator, a leveler, or an organic or inorganic molecule that similarly serves to enhance a surface morphology of the metal cations during reversible metal electrodeposition onto the transparent electrode;

wherein the additive reduces an RMS surface roughness of a reversibly deposited metal layer onto the transparent electrode to a value that is less than 30 nm.

20. The article as recited in claim 19, wherein the electrolyte additive comprises at least one of a polyol, an amine-based polymer, or a cellulose derivative.

21. The article as recited in claim 19, wherein the additive reduces an RMS surface roughness of a reversibly deposited metal layer onto the transparent electrode to a value that is less than 25 nm, less than 20 nm, less than 15 nm, less than 10 nm, or less than 5 nm.

22. The article as recited in claim 19, wherein the dynamic window is configured to achieve a near zero transmissivity to provide a privacy state, where transmission of visible light wavelengths after full tinting is 1% or less, 0.1% or less, 0.01% or less, or 0.001% or less.

23. The article as recited in claim 19, wherein the dynamic window is configured to achieve a high infrared reflectance of wavelengths in a range of 700 nm to 1200 nm that is at least 30%, at least 40%, at least 50%, at least 60%, or at least 70%.

24. The article as recited in claim 19, wherein the dynamic window is configured to achieve color neutral characteristics with a chroma (C*) of less than 10, less than 8, or less than 5, over an operative VLT range of the dynamic window.

25. An electrochromic dynamic window article capable of reversible metal electrodeposition, comprising:

a transparent or translucent conductive electrode;

an electrolyte in contact with the transparent or translucent conductive electrode, the electrolyte comprising metal cations that can be reversibly electrodeposited onto the transparent or translucent conductive electrode; and a counter electrode;

wherein the electrolyte comprises an additive configured to enhance a surface morphology of deposited metal cations during reversible metal electrodeposition, so as to enhance one or more of color neutrality, transmittance of visible wavelengths, infrared reflectance, or switching speed of the dynamic window;

where at least one of (i) or (ii):

(i) wherein the dynamic window is configured to achieve color neutral characteristics with a chroma (C*) of less than 10;

(ii) wherein the dynamic window is configured to achieve color neutral characteristics with |a*| or |b*| values of less than 5, over an operative VLT range of the dynamic window.

* * * * *